(12) United States Patent
Yamada et al.

(10) Patent No.: US 12,275,394 B2
(45) Date of Patent: Apr. 15, 2025

(54) OBJECT RECOGNITION DEVICE, PATH PLANNING DEVICE, PARKING SUPPORT DEVICE, OBJECT RECOGNITION SYSTEM, PATH PLANNING SYSTEM AND PARKING SUPPORT SYSTEM

(71) Applicant: Mitsubishi Electric Corporation, Tokyo (JP)

(72) Inventors: Hiroshi Yamada, Tokyo (JP); Takashi Matsumoto, Tokyo (JP); Masataka Shirozono, Tokyo (JP); Kenta Katsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 242 days.

(21) Appl. No.: 17/922,134

(22) PCT Filed: May 13, 2020

(86) PCT No.: PCT/JP2020/019058
§ 371 (c)(1),
(2) Date: Oct. 28, 2022

(87) PCT Pub. No.: WO2021/229704
PCT Pub. Date: Nov. 18, 2021

(65) Prior Publication Data
US 2023/0174054 A1    Jun. 8, 2023

(51) Int. Cl.
*B60W 30/06*    (2006.01)
(52) U.S. Cl.
CPC ....... *B60W 30/06* (2013.01); *B60W 2420/408* (2024.01); *B60W 2554/20* (2020.02); *B60W 2554/4041* (2020.02); *B60W 2554/80* (2020.02)

(58) Field of Classification Search
None
See application file for complete search history.

(56) References Cited

U.S. PATENT DOCUMENTS

| 6,438,491 B1* | 8/2002 | Farmer | G06V 10/255 |
| | | | 340/436 |
| 2008/0042894 A1* | 2/2008 | Kikuchi | G01S 7/411 |
| | | | 342/70 |

(Continued)

FOREIGN PATENT DOCUMENTS

| JP | 2013-020458 A | 1/2013 |
| JP | 2014-034321 A | 2/2014 |

(Continued)

OTHER PUBLICATIONS

Communication dated May 9, 2023, issued by the Japanese Patent Office in Japanese 2022-522156.

(Continued)

*Primary Examiner* — Daniel L Greene
(74) *Attorney, Agent, or Firm* — Sughrue Mion, PLLC

(57) ABSTRACT

An object recognition device having a distance measurement sensor mounted on an own vehicle and detects the distance to the object an own vehicle location detector that detects an own vehicle position an object detector that detects the object position based on the distance data and the own vehicle position, and an object distinguisher that distinguishes whether the object is a static object or a moving object based on a distance data, a vehicle position, and an object position wherein the static object distinguished by the object distinguisher is recognized as a static object to be detected, it is possible to reduce the annoyance given to a human such as a driver before guiding the vehicle to the target parking position without erroneously recognizing the target parking space.

6 Claims, 19 Drawing Sheets

(56) References Cited

U.S. PATENT DOCUMENTS

| | | | | |
|---|---|---|---|---|
| 2010/0271257 | A1* | 10/2010 | Hirogari | G01S 13/726 |
| | | | | 342/107 |
| 2013/0188826 | A1* | 7/2013 | Nishino | G06T 7/194 |
| | | | | 382/103 |
| 2019/0291720 | A1* | 9/2019 | Xiao | G08G 1/0112 |
| 2020/0353914 | A1* | 11/2020 | Hasejima | G01C 21/20 |
| 2021/0316763 | A1* | 10/2021 | Domahidi | B60W 40/105 |

FOREIGN PATENT DOCUMENTS

| | | |
|---|---|---|
| JP | 2014-069723 A | 4/2014 |
| JP | 2015-054603 A | 3/2015 |
| JP | 2017-067466 A | 4/2017 |

OTHER PUBLICATIONS

Chinese Office Action issued Jul. 20, 2023 in Application No. 202080100695.4.
Japanese Office Action dated Jan. 9, 2024 in Application No. 2022-522156.
International Search Report for PCT/JP2020/019058 dated, Aug. 11, 2020 (PCT/ISA/210).

* cited by examiner

FIG. 8
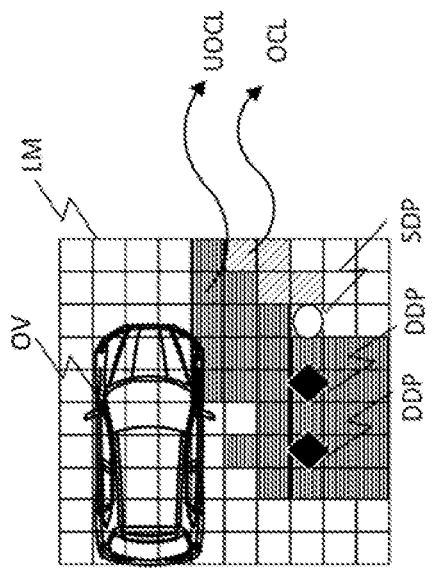
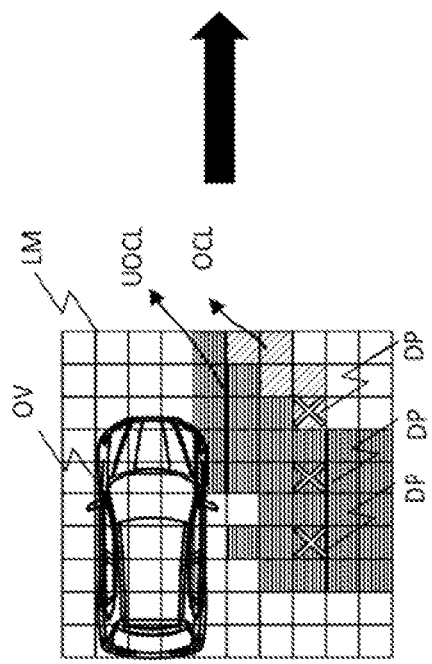

OBJECT RECOGNITION DEVICE, PATH PLANNING DEVICE, PARKING SUPPORT DEVICE, OBJECT RECOGNITION SYSTEM, PATH PLANNING SYSTEM AND PARKING SUPPORT SYSTEM

CROSS REFERENCE TO RELATED APPLICATIONS

This application is a National Stage of International Application No. PCT/JP2020/019058 filed May 13, 2020.

TECHNICAL FIELD

The present application relates to an object recognition device, a path planning device, a parking support device, an object recognition system, a path planning system, and a parking support system.

BACKGROUND ART

Conventionally, there is a technique known for supporting an operation of retreating a vehicle and perpendicular parking it in a parking space (see, for example, Patent Literature 1).

In Patent Literature 1, a parking support device is mounted on a vehicle and provides a sensor information acquisition means for acquiring the detection result of a distance measurement sensor that detects the distance to a side obstacle that is an obstacle on the side of the vehicle by receiving the reflected wave of the exploration wave transmitted to the side of the vehicle, and with a support means for supporting vehicle running in which the vehicle is retracted and perpendicular parked in the parking space, based on the score sequence of the detection results that are sequentially detected by the distance measurement sensor if the vehicle enters the parking space, which is acquired by the sensor information acquisition means, a linearity determining means for determining the linearity of the contour shape in the plane coordinate system with respect to the ground surface of the vehicle facing surface, which is the surface facing the vehicle side of the side obstacle, is provided, if there is a vehicle facing surface whose linearity determined by the linearity determining means does not exceed a predetermined threshold value, the support means is used, it supports vehicle running so that the vehicle can be perpendicular parked in the parking space in a direction along the vehicle facing surface, which has a higher straightness.

As a result, among the side obstacles of the vehicle if the vehicle retreats and enters the parking space, support will be provided to perpendicular park the vehicle in the parking space in a direction along the vehicle facing surface on the side where the contour shape of the vehicle facing surface seems to be straighter.

[Patent Literature 1] JP 2014-34321 A

DISCLOSURE OF INVENTION

Technical Problem

However, if there are vehicles on both sides of the target parking space and parking is done by remote control (hereinafter referred to as remote parking), in the vicinity of the remote parked vehicle, there are not only the parked vehicle but also a remote parking operator (a driver (or referred to as a driver) who operates the remote parked vehicle to be remotely parked). Therefore, as shown in FIG. 1, if the driver moves while maintaining the relative position with the behavior of the remote parked vehicle, using the technique of Patent Literature 1, the movement locus of the driver is grasped as the contour shape of the parked vehicle, and the target parking space is erroneously recognized, the driver may feel annoyed by performing unnecessary stray movements before guiding the vehicle to the deep part of the target parking space (hereinafter referred as the target parking position).

The present application discloses a technique made in view of the above circumstances, in order to suppress stray movements that give a sense of annoyance to human such as drivers before guiding the vehicle to the target parking position by distinguishing between moving objects such as moving drivers and static objects such as static parked vehicles, without misidentifying the target parking space.

Solution to Problem

The object recognition device disclosed in the present application provides a distance measurement sensor mounted on an own vehicle, wherein the distance measurement sensor sends the detection wave to the object to be detected and receives the reflected wave from the object of the detection wave, and detects the distance to the object as distance data, an own vehicle location detecting part that detects an own vehicle position from the data of the vehicle speed and traveling direction of the own vehicle, an object detecting part that detects the object position of the object based on the distance data detected by the distance measurement sensor and the own vehicle position detected by the own vehicle location detecting part, and an object distinguishing part that distinguishes whether the object detected by the object detecting part is a static object or a moving object based on a distance data detected by the distance measurement sensor, a vehicle position detected by the vehicle location detecting part, and an object position detected by the object detecting part, wherein the static object distinguished by the object distinguishing part is recognized as a static object to be detected.

The path planning device disclosed in the present application provides a path planning part that generates a guidance path for guiding the own vehicle to the target parking space, based on the result of distinguishing whether the object is a static object or a moving object output by the object recognition device and the own vehicle position detected by the own vehicle location detecting part.

The parking support device disclosed in the present application is a parking support device in which the own vehicle is controlled toward the parking space by an own vehicle control part mounted on the own vehicle, based on the guidance path planned by the path planning device.

Advantageous Effects of Invention

According to the present application, because of distinguishing between a moving object such as a moving driver and a static object such as a static parked vehicle, it is possible to prevent misrecognition of the target parking space, and then it is possible to suppress unnecessary stray movements of the vehicle until the vehicle is guided to the

BRIEF DESCRIPTION OF DRAWINGS

FIG. 8 is a diagram showing the first embodiment of the present application, and is an explanatory drawing for demonstrating the example of the result if the object distinction part performs the object distinction in the environment where there is a human moving while maintaining the relative position with the vehicle.

DESCRIPTION OF EMBODIMENTS

Figure 1:
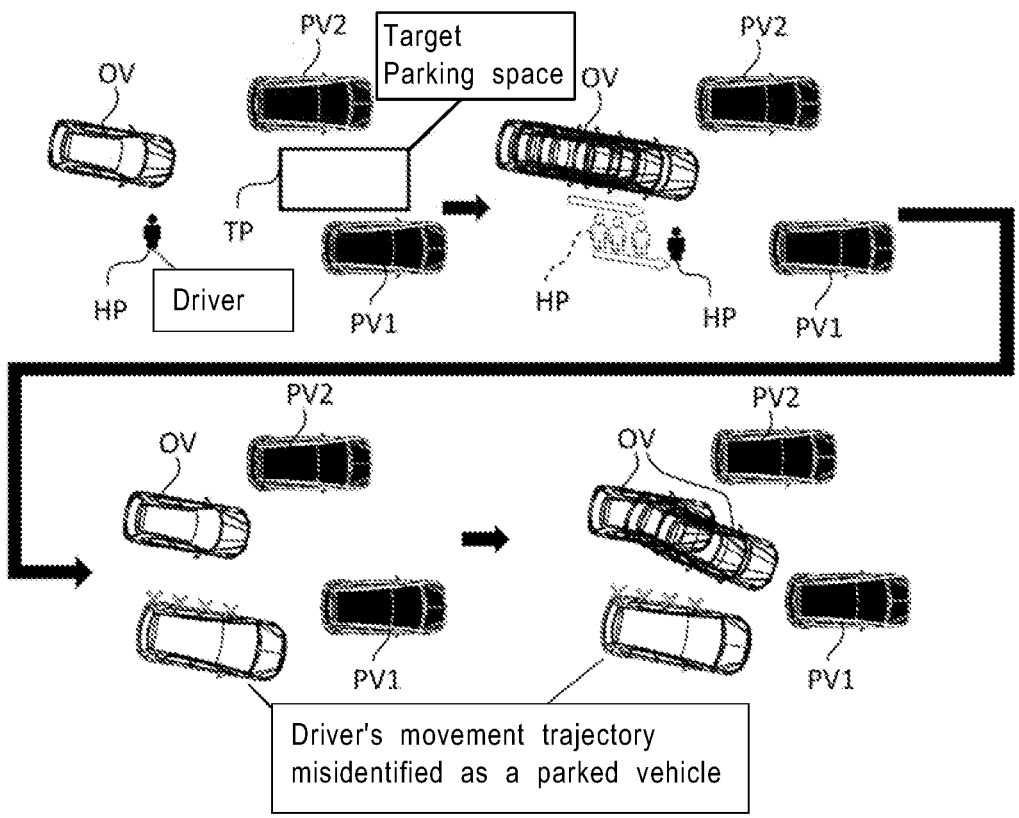
FIG. 1 is an explanatory diagram showing an example of a problem to be solved by the present application by schematization.

Hereinafter, embodiments of the object recognition device according to the present application will be described. In the description of the drawings, the same parts or corresponding parts are designated by the same reference numerals, and duplicate explanations will be omitted.

First Embodiment

Configuration Diagram

Figure 2:
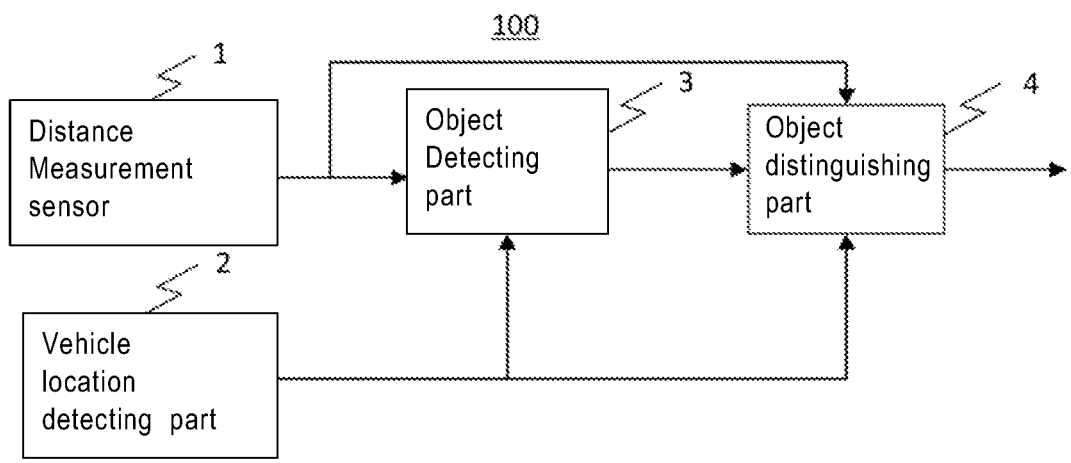
FIG. 2 is a diagram showing the first embodiment of the present application, and is a diagram showing a configuration example of an object recognition device (or an object recognition system) with a functional block diagram.

FIG. 2 is a block diagram showing the configuration of the object recognition device 100 according to the first embodiment of the present application. As shown in FIG. 2, the object recognition device 100 is provided with an object distinguishing part 4 that distinguishes objects by receiving the outputs of an object detecting part 3, a distance measurement sensor 1, an own vehicle location detecting part 2, and the object detecting part 3*n* that receives the outputs of the distance measurement sensor 1 and the own vehicle location detecting part 2.

Next, the operation of each configuration of FIG. 2 will be described. The distance measurement sensor 1 is composed of at least two or more distance measurement sensors attached to the vehicle, and outputs distance data to the detected object to the object detecting part 3 and the object distinguishing part 4. Specifically, the distance measurement sensor 1 irradiates the object to be detected with ultrasonic waves, receives the ultrasonic waves reflected from this object, signal processing is performed based on the time difference from the irradiated ultrasonic wave, the distance to the object is detected as distance data. In this case, the only data that can be detected by the distance measurement sensor is the distance to the object, it does not matter if the position, direction, etc. where the object exists cannot be detected. Further, the distance measurement sensor 1 detects the distance data at a preset cycle.

Figure 3:
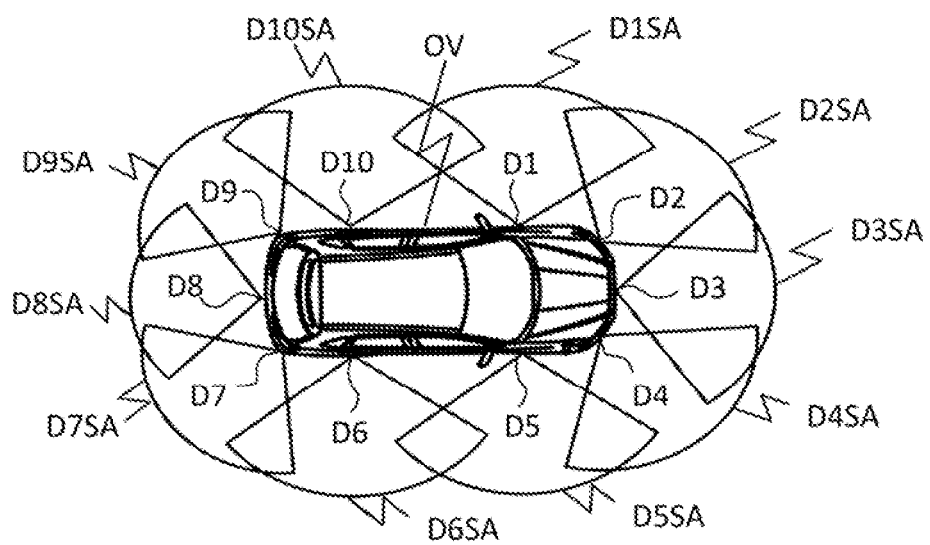
FIG. 3 is a diagram showing the first embodiment of the present application, and is a diagram showing an example of a showing position of a distance measurement sensor on a vehicle.

It is possible to mount multiple distance measurement sensors on the vehicle, although it is possible to set the mounting position arbitrarily, as shown in FIG. 3, it is desirable to mount a distance measurement sensor to be able to detect the surroundings of the vehicle.

In order to configure the object recognition device 100, the mounting position of the distance measurement sensor can be recognized if there are at least two or more in the same direction in which the object is recognized. In FIG. 3, if the object on the right side of the vehicle is recognized, regardless of the combination required for the distance measurement sensors D4, D5, D6, D7 at the positions shown in the figure of the own vehicle OV, for example, if recognizing an object on the left side of the vehicle, the combination with the distance measurement sensors D1, D2, D9, and D10 at the positions shown in the figure of the own vehicle OV does not matter. In FIG. 3, the detectable range of the distance measurement sensors D1, D2, D3, D4, D5, D6, D7, D8, D9, and D10 illustrate the fan-shaped detectable range D1SA, D2SA, D3SA, D4SA, D5SA, D6SA, D7SA, D8SA, D9SA, D10SA.

Here, it is assumed that the mounting position of the distance measurement sensor on the vehicle, the sensor orientation information of the distance measurement sensor, and the maximum detection distance of the distance measurement sensor are known. The sensor orientation information includes the mounting orientation of the distance measurement sensor and the sensor viewing angle. Further, the sensor viewing angle of the distance measurement sensor corresponds to the directional width that can be detected by the sensor. The mounting position of the distance measurement sensor on the vehicle, the sensor orientation information of the distance measurement sensor, and the maximum detection distance of the distance measurement sensor are collectively referred as known sensor information.

As the distance measurement sensor, a sensor of a type that detects the distance to an object as distance data by using a detection wave such as an electromagnetic wave instead of ultrasonic waves may be used. Specifically, as the distance measurement sensor, an ultrasonic sensor, a millimeter wave radar, a laser radar, or an infrared sensor can be used.

The own vehicle location detecting part 2 detects the state regarding the speed and the traveling direction of the vehicle as the vehicle data, and detects the state, the position and attitude angle of the vehicle are detected from the detected vehicle data. Then, the detected position and posture angle of the vehicle are output to the object detecting part 3 and the object distinguishing part 4. Specifically, the own vehicle location detecting part 2 detects a state related to the speed and the traveling direction of the vehicle, such as the speed of the vehicle, the wheel speed, the steering angle, and the yaw rate, as the vehicle data. The own vehicle location detecting part 2 detects the vehicle data at a preset cycle.

Further, the own vehicle location detecting part 2 may be configured to detect the latitude, longitude, and traveling direction of the vehicle as the own vehicle data by using GPS (Global Positioning System).

Various methods can be considered for calculating the position and attitude angle of the vehicle, but as an example, a method using the yaw rate and the wheel speed will be described.

Using the vehicle position and the vehicle posture angle at the start of distance data acquisition from the distance measurement sensor 1 as the reference axes, each time the own vehicle location detecting part 2 detects the vehicle data, the relative vehicle position coordinates and the attitude angle of the vehicle are calculated.

The vehicle position coordinates are calculated based on the hourly travel distance obtained from the wheel speed output from the own vehicle location detecting part 2 and the hourly yaw angle obtained from the yaw rate output from the own vehicle location detecting part 2, by calculating the moving position for each hour and adding the moving position to the vehicle position on the reference axis. Further, the posture angle of the vehicle is obtained by adding the yaw angles for each time obtained from the yaw rate output from the own vehicle location detecting part 2 from the time of the reference axis. Further, in the first embodiment, the origin of the reference axis is set at the position centered on the rear wheel axle in the vehicle width direction, but setting the reference axis at any position does not affect the first embodiment. Furthermore, the vehicle position detected by the own vehicle location detecting part 2 is stored in a storage unit (not shown) in association with the time if the vehicle data is detected.

The object detecting part 3 detects the position of objects around the vehicle based on the distance data detected by the distance measurement sensor 1 and the vehicle position and attitude angle detected by the own vehicle location detecting part 2. Then, the detected object position is output to the object distinguishing part 4. Further, the object position is associated with the detected time and is stored in a storage unit (not shown) each time the object position is detected.

If the object detecting part 3 does not store any object position in the storage unit, the object detecting part 3 does not output anything to the object distinguishing part 4, if stored, all detected object positions are output. Further, the storage unit may be provided with a storage upper limit, and if an amount exceeding the storage upper limit is detected by the object detecting part, the storage unit may be provided, the oldest detected time may be deleted from the storage unit.

As a specific detection method of the object position by the object detecting part 3, examples thereof include a determination method of estimating the position of a reflection point reflected on an object by a reflected wave such as an ultrasonic wave output from the distance measurement sensor 1 and determining the position of the object.

As the above technique, for example, a known technique (hereinafter referred to as a 2-circle tangent technique) disclosed in JP 2016-75501 A can be used.

The object distinguishing part 4 distinguishes whether the object detected by the object detecting part 3 is a moving object or a static object, based on the distance data detected by the distance measurement sensor 1, the vehicle position and attitude angle detected by the own vehicle location detecting part 2, and the object position detected by the object detecting part 3.

Overall Operation

Figure 4:
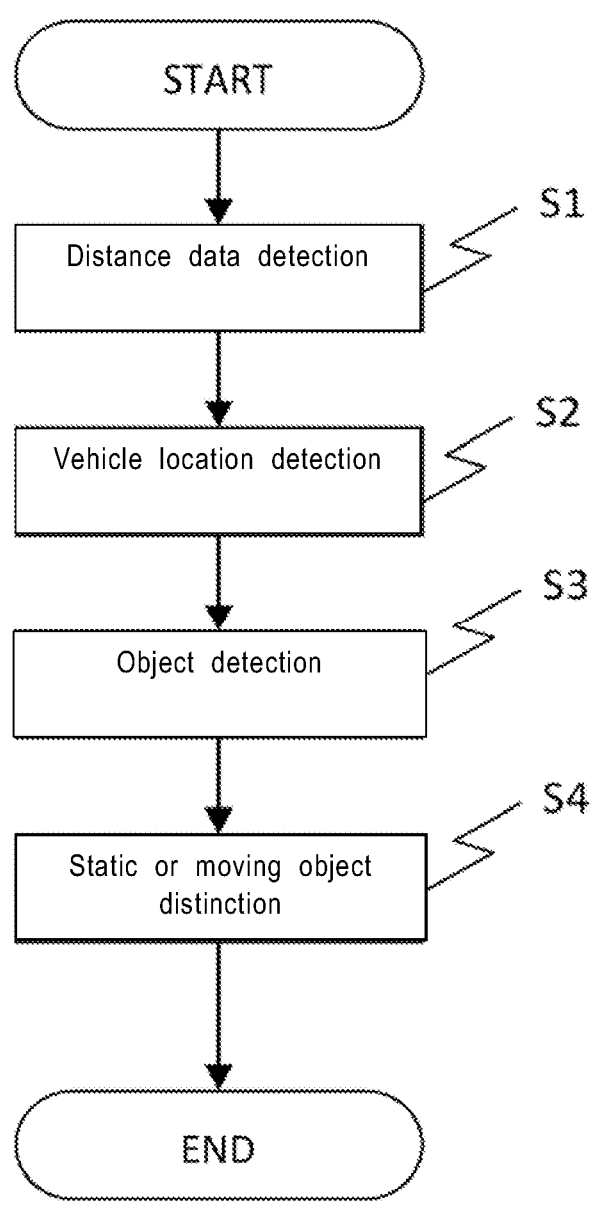
FIG. 4 is a diagram illustrating the first embodiment of the present application, and is a diagram showing an example of the overall operation of the illustrated object recognition device (or object recognition system) in FIG. 2 in a flowchart.

Next, the overall operation of the object recognition device 100 according to the first embodiment will be described with reference to the flowchart shown in FIG. 4. The processing of the flowchart of FIG. 4 is repeatedly executed while the vehicle is running. The relationship between each step in FIG. 4 and each functional block in FIG. 2 is as follows. Step S1 is an operation performed by the distance measurement sensor 1, step S2 is an operation performed by the own vehicle location detecting part 2, and step S3 is an operation performed by the object detecting part 3, step S4 is an operation performed by the object distinguishing part 4.

Next the operation of each step of FIG. 4 will be described. In step S1, the object to be detected is irradiated with the detection wave, and the detection wave is applied, by acquiring the reflected wave, the distance data between the vehicle and the object is detected.

In step S2, the state regarding the speed and the traveling direction of the vehicle is detected as the vehicle data, the position and attitude angle of the vehicle are detected from the detected vehicle data.

In step S3, the object around the vehicle is detected and the object position information is acquired based on the distance data and the position and attitude angle of the vehicle.

In step S4, distinction whether the detected object is a moving object or a static object is done based on distance data, vehicle position, attitude angle and object position.

Object Distinguishing Processing

Figure 5:
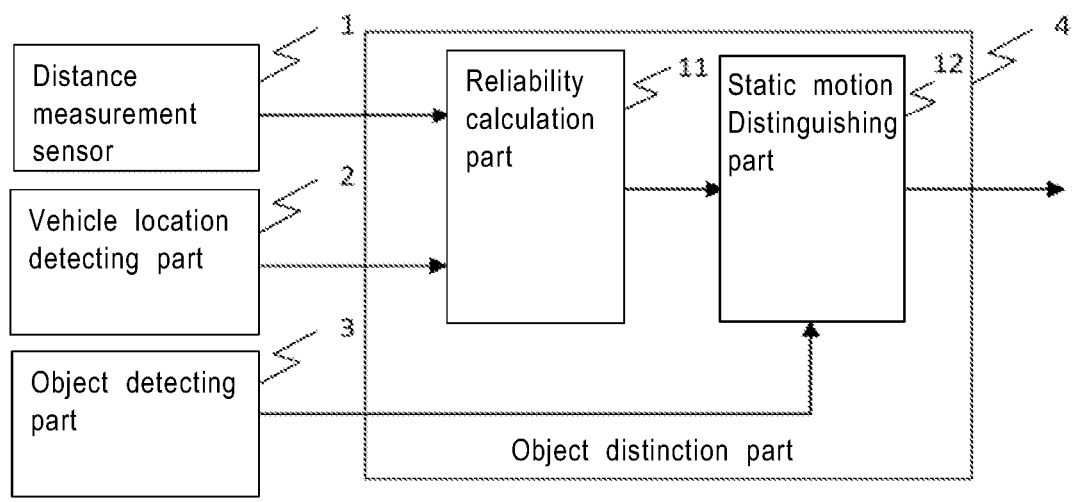
FIG. 5 is a diagram showing the first embodiment of the present application, and is a diagram showing a configuration example of the object distinguishing part illustrated in FIG. 2 in a functional block diagram.

Next, the object distinguishing process in the object distinguishing part 4 will be described. FIG. 5 is a functional block diagram showing the configuration of the object distinguishing part 4. As shown in FIG. 5, the object distinguishing part 4 includes a reliability calculation part 11 and a static motion distinguishing part 12.

Next, the operation of each functional block of FIG. 5 will be described. The reliability calculation part 11 calculates the reliability of the existence of objects around the vehicle, based on the distance data detected by the distance measurement sensor 1 and the vehicle position and attitude angle detected by the own vehicle location detecting part 2. Then, the calculated reliability is transmitted to the static motion distinguishing part 12.

The reliability calculated by the reliability calculation part 11 represents the reliability of whether or not there is a high probability that an object exists around the vehicle, if the reliability is high, it means that there is a high probability that an object will exist around the vehicle, if the reliability is low, it means that the probability that an object exists around the vehicle is low.

As an example of the method of calculating the reliability of the existence of an object around the vehicle by the reliability calculation part 11, a virtual space is set around the vehicle, a map that divides the virtual space into a grid pattern (hereinafter referred to as a grid map) is generated, each grid on the grid map is given a degree of occupancy, which is a measure of whether or not it is occupied by an object, a method of using the occupancy as the reliability can be mentioned.

In addition, the grid map is generated once if the object distinguishing process is started for the first time in the object recognition process, updates the occupancy of each grid on the grid map based on the distance data detected by the distance measurement sensor 1 and the vehicle position and attitude angle detected by the own vehicle location detecting part 2, after storing in a storage unit (not shown). After that, every time the distance data in the distance measurement sensor 1 and the vehicle position and the posture angle in the own vehicle location detecting part 2 are updated, the occupancy of each grid of the grid map is updated.

As a method for calculating the occupancy of each grid in a grid map, for example, the map generation method disclosed in JP 2019-200049 A can be used. (Hereafter referred to as grid map technology.)

The static motion distinguishing part 12 distinguishes whether the object detected by the object detecting part 3 is a static object or a moving object, and outputs the distinction result based on the object position detected by the object detecting part 3 and the reliability of the existence of the object around the vehicle calculated by the reliability calculation part 11.

As a method of distinguishing whether the object detected by the object detecting part 3 in the static motion distinguishing unit 12 is a static object or a moving object, the reliability information of the existence of an object around the vehicle calculated by the reliability calculation part 11 is collated with the object position detected by the object detecting part 3, and the object position is collated, the reliability of the existence of the object at the object position detected by the object detecting part 3 is confirmed. Then, if the reliability of the existence of an object is higher than a predetermined threshold, the object is determined to be a static object, if it is below the threshold value, it is determined to be a moving object.

For the reliability around the vehicle calculated by the reliability calculation part 11, since the distance data in the distance measurement sensor 1 and the vehicle position and the posture angle in the own vehicle location detecting part 2 are updated every time, the distinction process in the static motion distinguishing part 12 may be updated according to the update cycle of the reliability calculation part 11.

Below, if the vehicle is moving forward, the object distinction result in the object distinguishing part if the human moves while maintaining the relative position with the vehicle, and the object distinction result in the object distinguishing part if the vehicle passes by the parked vehicle, will be described with reference to FIGS. 6 to 11.

Figure 6:
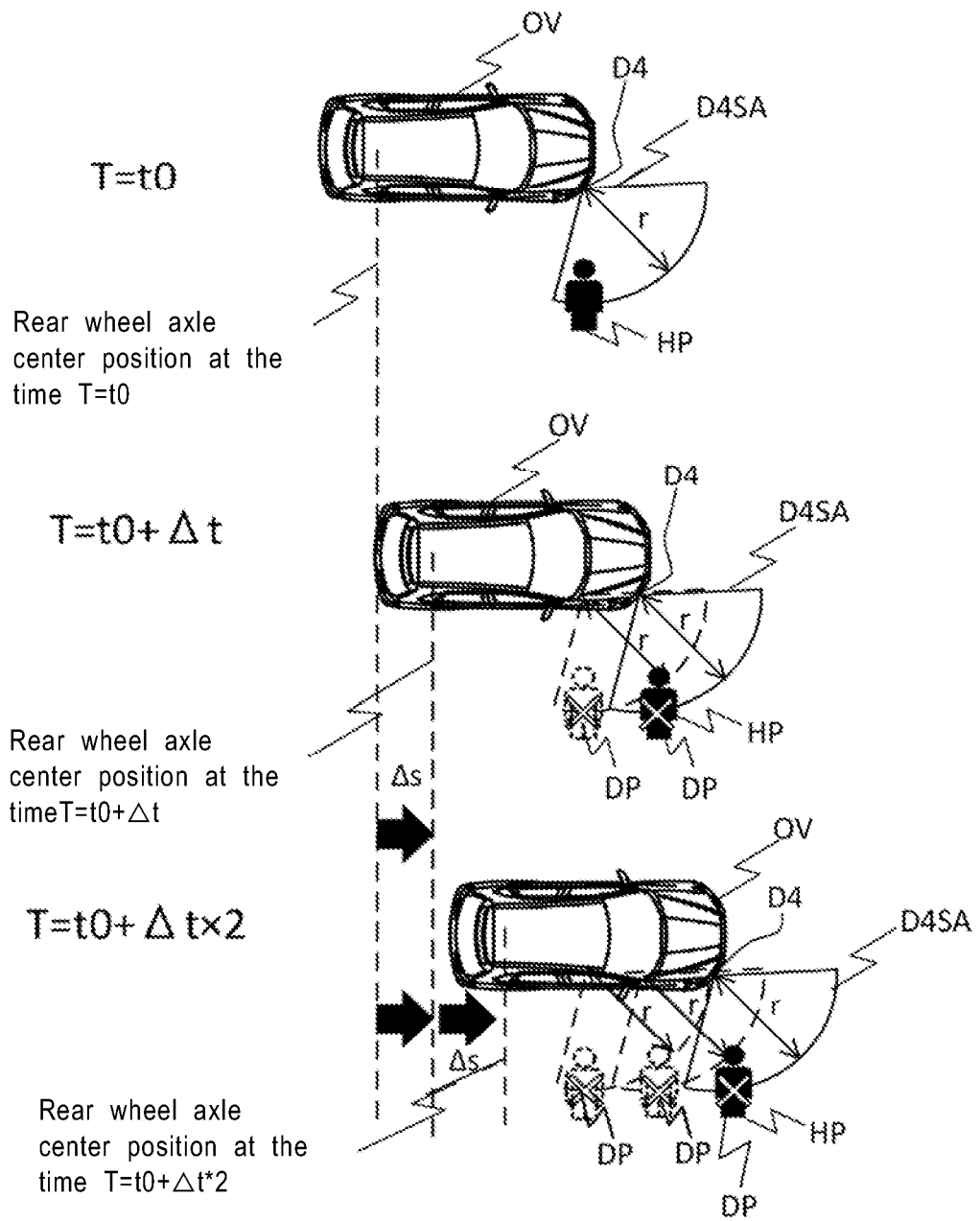
FIG. 6 is a diagram showing the first embodiment of the present application, and is an explanatory drawing for demonstrating the example of the operation if the object detecting part performs the object detection in the environment where there is a human moving while maintaining the relative position with the vehicle.

First, the case where the human HP moves while maintaining the relative position with the own vehicle OV while the own vehicle OV is moving forward will be described with reference to FIGS. 6 to 8. FIG. 6 shows how the object detecting part 3 detects the object position from the time $T=t0$ to $T=t0+Lt*2$.

If the human HP is on the right side of the own vehicle OV at time $T=t0$, the distance r can be detected by the distance measurement sensor D4 on the right side of the front, since the distance measurement sensor that can measure only the distance cannot detect the position, the known sensor information is used, it is possible to illustrate the existence range of human HP with the range sensor D4 in the fan-shaped detection range.

If the human HP and the own vehicle OV advance by $\Delta s$ while maintaining the relative position at the time $T=t0+\Delta t$, the distance measurement sensor D4 on the right side of the front can detect the same distance r as the distance detected at time $T=t0$, similarly, the distance measurement sensor D4 with a fan-shaped detection range can illustrate the existence range. In addition, by using the 2-circle tangent technique, which is a known technique, it is possible to determine the position of the human HP, the object detecting part 3 detects the object position DP of the human HP.

If the human HP and the own vehicle OV proceed by $\Delta s$ while maintaining the relative position at the time $T=t0+\Delta t*2$, similar to the time $T=t0$ and $T=t0+\Delta t$, the distance measurement sensor D4 on the right side of the front can detect the same distance r, the object detecting part 3 further detects the object position DP of the human HP.

Figure 7:
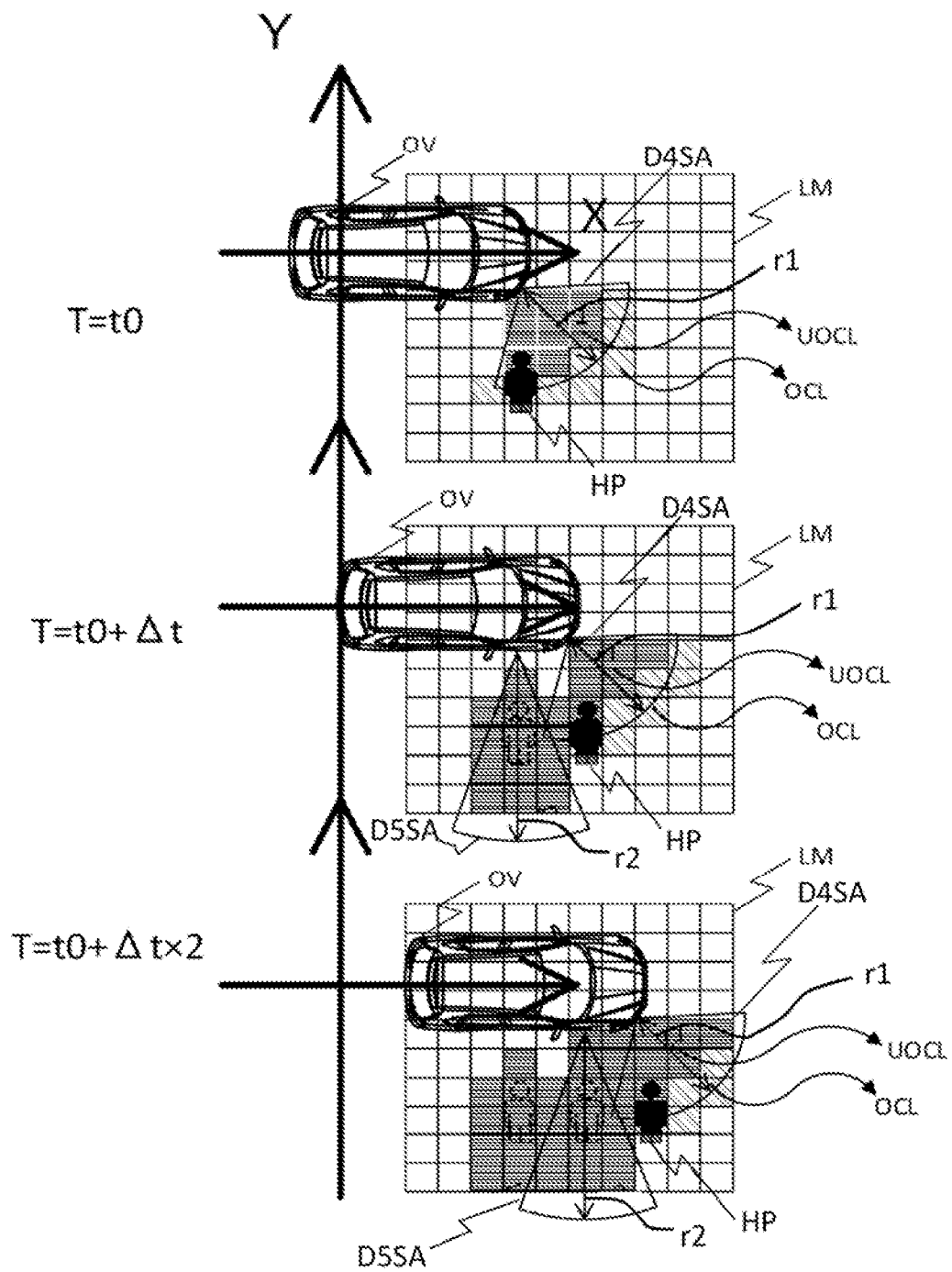
FIG. 7 is a diagram showing the first embodiment of the present application, and is an explanatory diagram for demonstrating the example of an operation in which the reliability calculation unit calculates the reliability of the existence of an object around the vehicle in an environment where there is a human moving while maintaining the relative position with the vehicle.

Next, FIG. 7 shows how the reliability calculation part 11 calculates the reliability of the existence of an object around the vehicle from the time $T=t0$ to $T=t0+\Delta t*2$. As a method of calculating the reliability of the existence of an object around the vehicle in the reliability calculation part 11, it is possible to use a grid map technique which is a known technique.

At time $T=t0$, the coordinate system shown in FIG. 7 is taken, with the center position of the rear wheel axle of the own vehicle OV as the origin and the direction in which the front of the own vehicle OV is facing as the positive direction of the X axis, as shown in FIG. 7, a grid map LM is generated around the own vehicle OV. The grid map of FIG. 7 is generated and stored once at the start of movement of the vehicle (time $T=t0$), and then the stored map is recalled and then updated during movement.

If the detection distance if human HP is detected by the distance measurement sensor D4 on the right side of the front at time $T=t0$ is r1, the grid OCL existing on the arc of the detected distance r1 sets the reliability high, and the grid UOCL in the range existing in the sector below the detection distance sets the reliability low.

If the human HP and the own vehicle OV advance by $\Delta s$ while maintaining the relative position at the time $T=t0+\Delta t$, since the distance detected by the distance measurement sensor D4 on the right side of the front is the same as if the time $T=t0$, the distance r1 is detected, but the distance measurement sensor D5 on the right side detects a distance r2 larger than the distance r1 detected by the distance measurement sensor D4 on the front right side at time $T=t0$. Therefore, part or all of the grid OCL range that is set to have high reliability at time $T=t0$ is set to have a low reliability (the area to which the UOCL grid belongs), at $T=t0+\Delta t$, the reliability of only a part of the grid in the range detected by the distance measurement sensor D4 on the right side of the front is set high (the area to which the grid of OCL belongs).

If the human HP and the own vehicle OV advance by $\Delta s$ while maintaining the relative position at the time $T=t0+\Delta t*2$, similar to the time $T=t0$ and $T=t0+\Delta t$, the distance measurement sensor D4 on the right side of the front detects the same distance r1, but, similar to time $T=t0+\Delta t$, the distance measurement sensor D5 on the right side detects a distance r2 larger than the distance r1 detected by the distance measurement sensor D4 on the front right side at time $T=t0+\Delta t$, at time $T=t0+\Delta t$, part or all of the grid range set as high reliability is set as low reliability (the area to which the UOCL grid belongs), at time $T=t0+\Delta t*2$, only the reliability of a part of the grid detected by the distance measurement sensor D4 on the right side of the front is set to high (the region to which the grid of OCL belongs).

From the above results, if the object position DP detected between the time $T=t0$ and $T=t0+\Delta t*2$ and the result of the grid map LM are superimposed, the result at time $T=t0+\Delta t*2$ can be expressed as shown in FIG. 8.

In other words, in the movement trajectory of the human HP, the reliability of the past position is low, and the reliability of the final position is high, it is possible to determine the object position with high reliability as the static object position SDP and the object position with low reliability as the moving object position DDP. In other words, it is possible to prevent erroneous detection of the tracing of a moving object.

Figure 9:
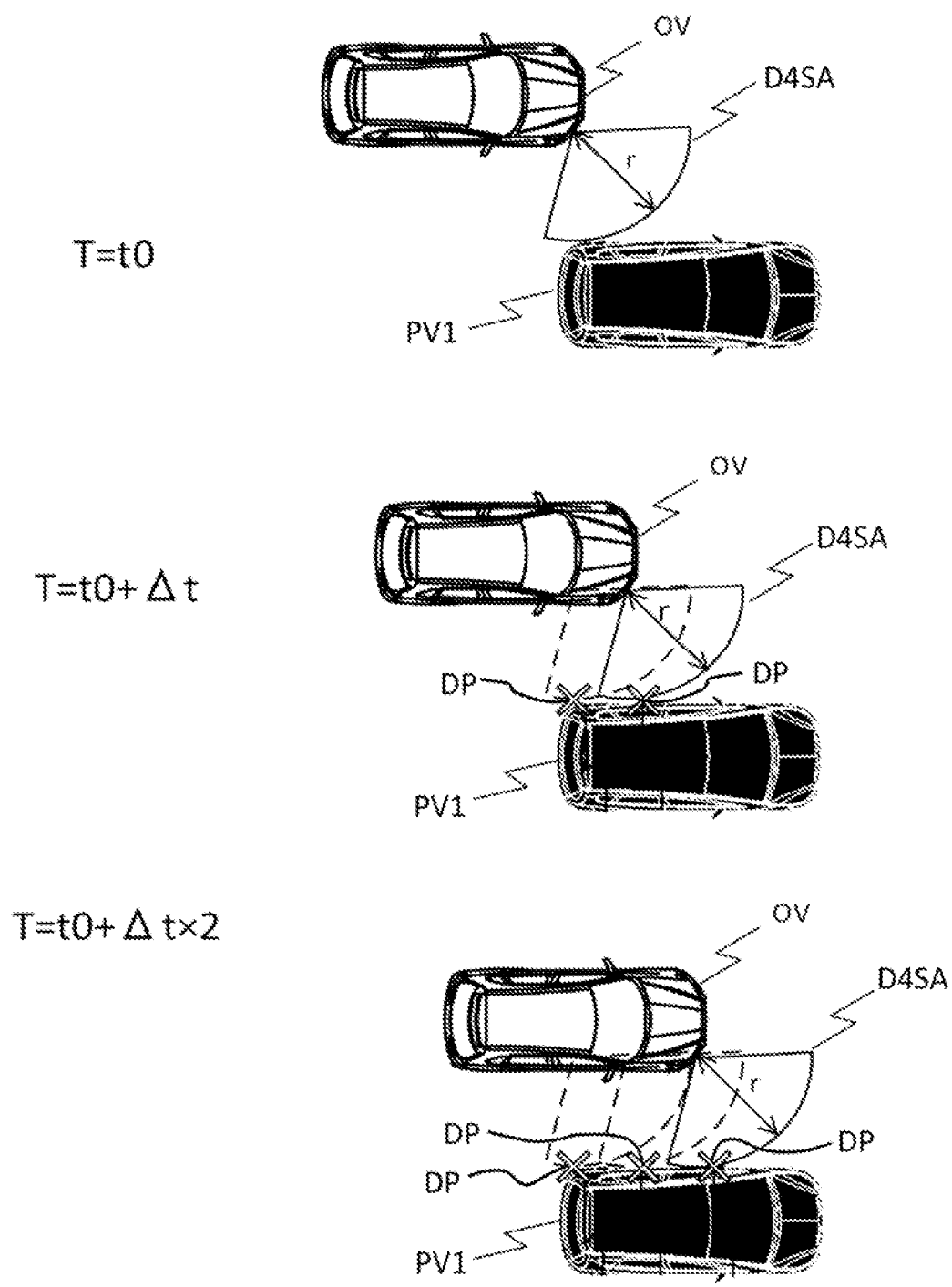
FIG. 9 is a diagram showing the first embodiment of the present application, and is an explanatory drawing for demonstrating the example of the operation which the reliability calculation part calculates the reliability of the existence of the object around the vehicle in the environment where the vehicle moves by the static parked vehicle.

Next the object distinction result in the object distinguishing part if the own vehicle OV passes by the parked vehicle PV1 will be described with reference to FIGS. 9 to 11. FIG. 9 shows how the object detecting part 3 detects the object position from the time $T=t0$ to $T=t0+\Delta t*2$.

If there is a static parked vehicle PV1 on the right side of the own vehicle OV at time $T=t0$, the distance r can be detected by the distance measurement sensor D4 on the right side of the front, but the distance measurement sensor that can measure only the distance cannot detect the position, as in the case of detecting a human, it is possible to illustrate the range in which the distance measurement sensor can measure the distance with the distance measurement sensor D4 in the fan-shaped detection range by using the known sensor information.

If only the own vehicle OV advances $\Delta s$ at the time $T=t0+\Delta t$, since the same distance r can be detected by the distance measurement sensor D4 on the right side of the front, the existence range can be illustrated by the distance measurement sensor D4 in the fan-shaped detection range as well. Then, by using the 2-circle tangent technique, if the distance measurement sensor detects the distance, it is possible to determine the position of the point where the irradiated ultrasonic wave is reflected on the object (reflection point position), the object detecting part 3 detects the reflection point position DP of the parked vehicle PV1.

If only the own vehicle OV advances $\Delta s$ at time $T=t0+\Delta t*2$, similar to the times $T=t0$ and $T=t0+\Delta t$, the distance measurement sensor D4 on the right side of the front can detect the same distance r, the object detecting part t 3 further detects the reflection point position DP of the parked vehicle PV.

Figure 10:
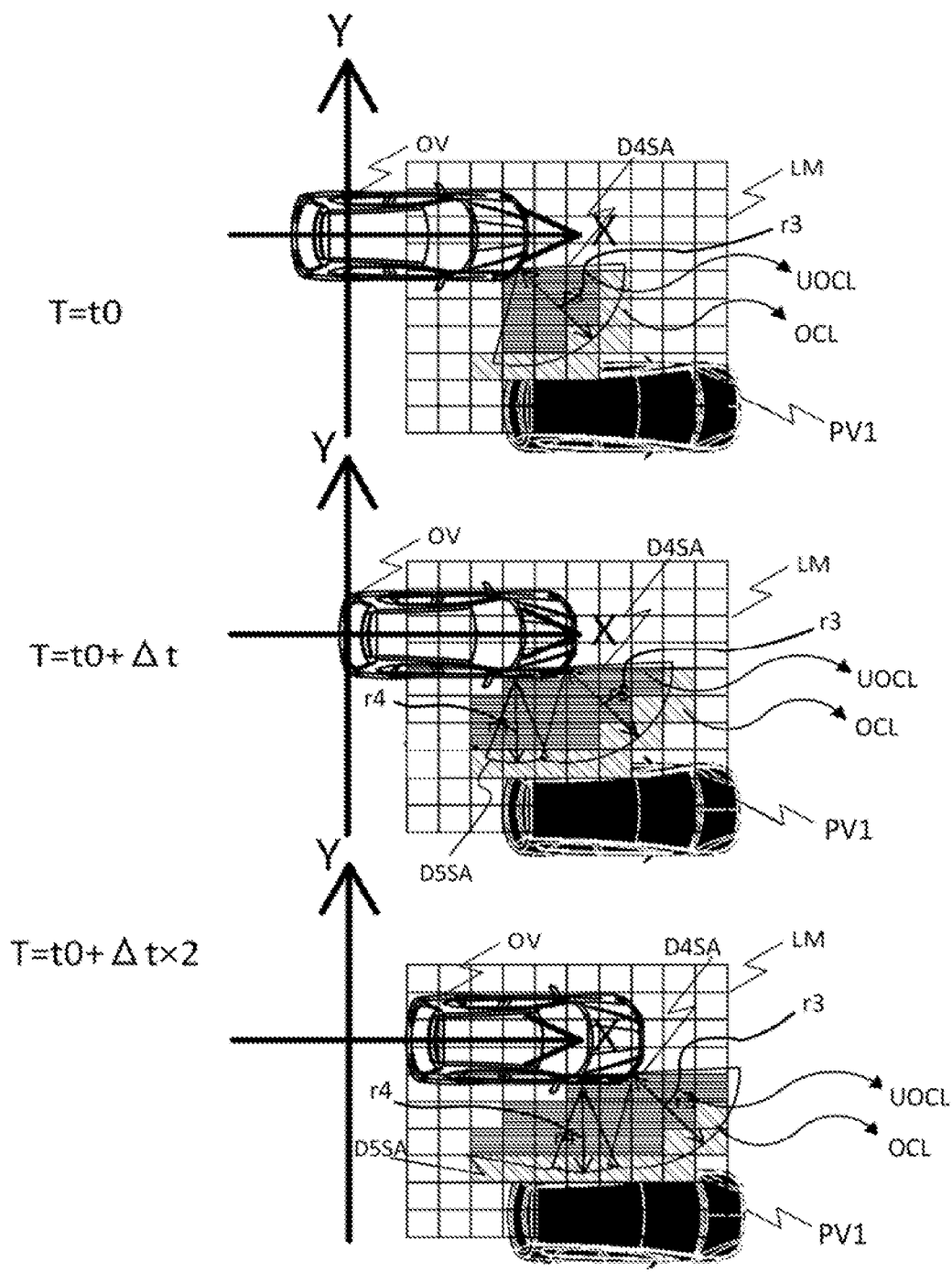
FIG. 10 is a diagram showing the first embodiment of the present application, and is an explanatory drawing for demonstrating the example of the operation which calculates the reliability of the existence of the object around the vehicle by the reliability calculation part.

Next, FIG. 10 shows how the reliability calculation part 11 calculates the reliability of the existence of an object around the vehicle from the time $T=t0$ to $T=t0+\Delta t*2$. As a method of calculating the reliability of the existence of an object around the vehicle in the reliability calculation part 11, it is possible to use a grid map technique which is a known technique.

At time $T=t0$, the coordinate system shown in FIG. 10 is taken, with the center position of the rear wheel axle of the own vehicle OV as the origin and the direction in which the front of the own vehicle OV is facing as the positive direction of the X axis, as shown in FIG. 10, a grid map LM is generated around the own vehicle OV. The grid map of FIG. 10 is generated and stored once at the start of movement of the vehicle (time $T=t0$), and then the stored map is recalled and then updated during movement.

At time $T=t0$, the grid OCL existing on the arc of the distance r3 detected by the distance measurement sensor D4 on the right side of the front sets the reliability high, and the grid UOCL in the range existing in the sector below the detection distance sets the reliability low.

At the time $T=t0+\Delta t$, if only the own vehicle OV advances $\Delta s$, the distance measurement sensor D4 on the right side of the front detects the same distance r3 as at time $T=t0$, the distance measurement sensor D5 on the right side detects the distance r4 to the static parked vehicle PV1. Therefore, many of the grid OCL ranges that are set to be highly reliable at $T=t0$ are still set to be highly reliable (the area to which the OCL grid belongs), at $T=t0+\Delta t$, the reliability of the grid in the range detected by the distance measurement sensor D4 on the right side of the front is also set with high reliability (the area to which the grid of OCL belongs).

At $T=t0+\Delta t*2$, if only the own vehicle OV advances $\Delta s$ further, the distance measurement sensor D4 on the right side of the front detects the same distance r3 as at time $T=t0$ and $T=t0+\Delta t$, the distance measurement sensor D5 on the right side detects the same distance r4 as the distance to the static parked vehicle PV1 detected at time $T=t0+\Delta t$, many of the grid OCL ranges that were set to be reliable at time $T=t0+\Delta t$ are still set to be reliable (the area to which the OCL grid belongs), at time T=t0+Δt*2, the grid OCL in the range detected by the distance measurement sensor D4 on the right side of the front is also set with high reliability (the area to which the grid of OCL belongs).

Figure 11:
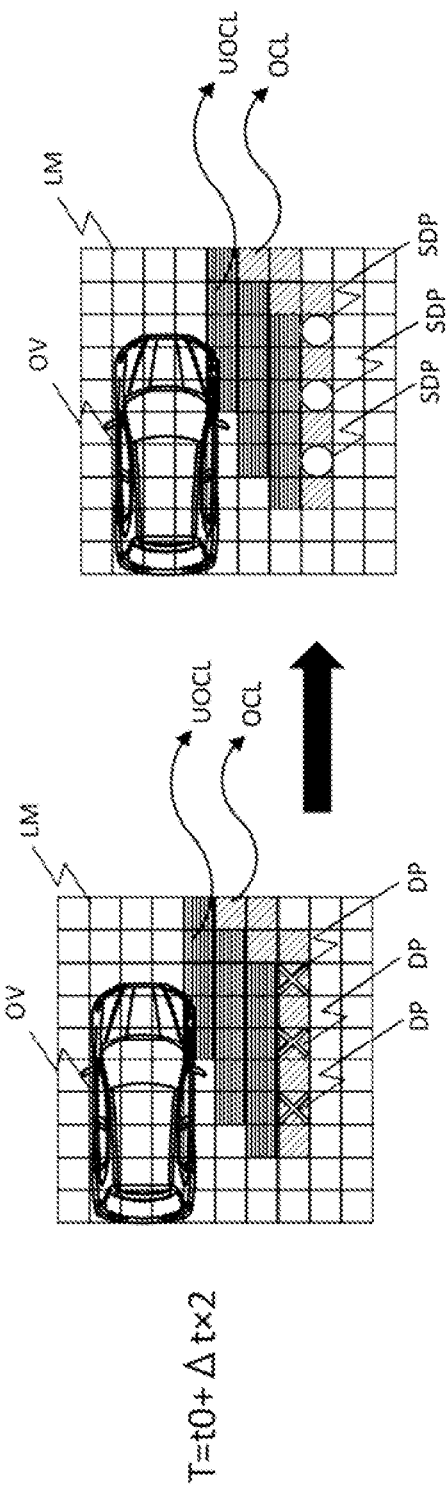
FIG. 11 is a diagram showing the first embodiment of the present application, and is an explanatory drawing for demonstrating the example of the result if the object distinction part performs the object distinction in the environment where the vehicle moves by the static parked vehicle.

From the above results, if the object position DP detected between the time T=t0 and T=t0+Δt*2 and the result of the grid map LM are superimposed, the result at time T=t0+Δt*2 can be expressed as shown in FIG. 11.

In other words, with respect to the parked vehicle PV1, the object positions detected by the object detecting part 3 all have high reliability, so that the object position with high reliability can be determined as the static object position SDP.

From the above, by assigning the reliability of the existence of the object calculated by the reliability calculation unit 11 to the object position detected by the object detecting part 3, it is possible to distinguish whether the detected object is a moving object or a static object.

In the above, the object distinction process has been described by taking the case of forward movement as an example, but the object distinction can be similarly performed at the time of backward movement. Further, in the above, regarding the mounting position of the distance measurement sensor on the own vehicle OV shown in FIG. 3, the sensors at the positions of D4 and D5 were used, however, by using two or more sensors of any one of D4, D5, D6, and D7, it is possible to distinguish objects.

Figure 12:
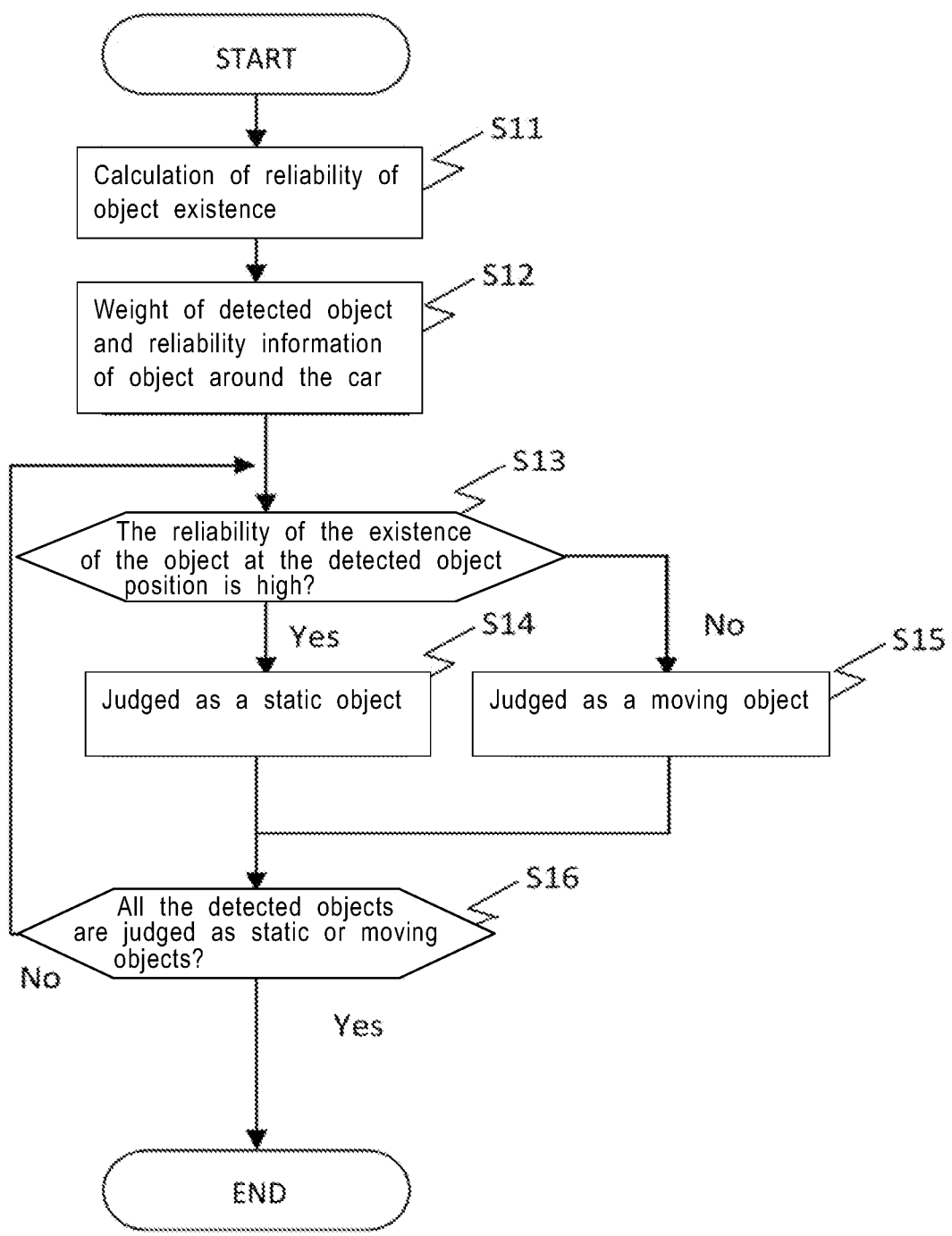
FIG. 12 is a diagram showing the first embodiment of the present application, and is a diagram showing an example of an object distinguishing process of an object distinguishing part in a flowchart.

Next, the flow of the operation performed by the object distinguishing part 4 will be described with reference to the flowchart of FIG. 12. The relationship between each step in FIG. 12 and each functional block in FIG. 5 is as follows. Step S11 is an operation performed by the reliability calculation unit 11, and steps S12, S13, S14, S15, and S16 are operations performed by the static motion distinguishing part 12.

Next the operation of each step of FIG. 12 will be described. In step S11, the reliability of the existence of objects around the vehicle is calculated, based on the distance data detected by the distance measurement sensor 1 and the vehicle position and attitude angle detected by the own vehicle location detecting part 2.

In step S12, the detected object position is superimposed on the reliability of the existence of the object around the vehicle based on the reliability of the existence of the object around the vehicle and the position of the object detected by the object detecting part 3.

In step S13, it is compared whether or not the reliability of the existence of the object at the detected object position is higher than the predetermined threshold value, if it is high (Yes), the process proceeds to step S14, and if it is low (No), the process proceeds to step S15.

If the process proceeds to step S14, the object at the detected object position is determined as a static object.

If the process proceeds to step S15, the object at the detected object position is determined as a moving object.

In step S16, it is confirmed whether all the detected objects are determined to be static objects or moving objects, if all are judged (Yes), the operation in the object distinguishing part 4 is terminated and the operation is terminated, if not all have been determined (No), the process of step S13 and subsequent steps is repeated.

Path Planning Device

Next, a path planning device using the object recognition device will be described.

Figure 13:
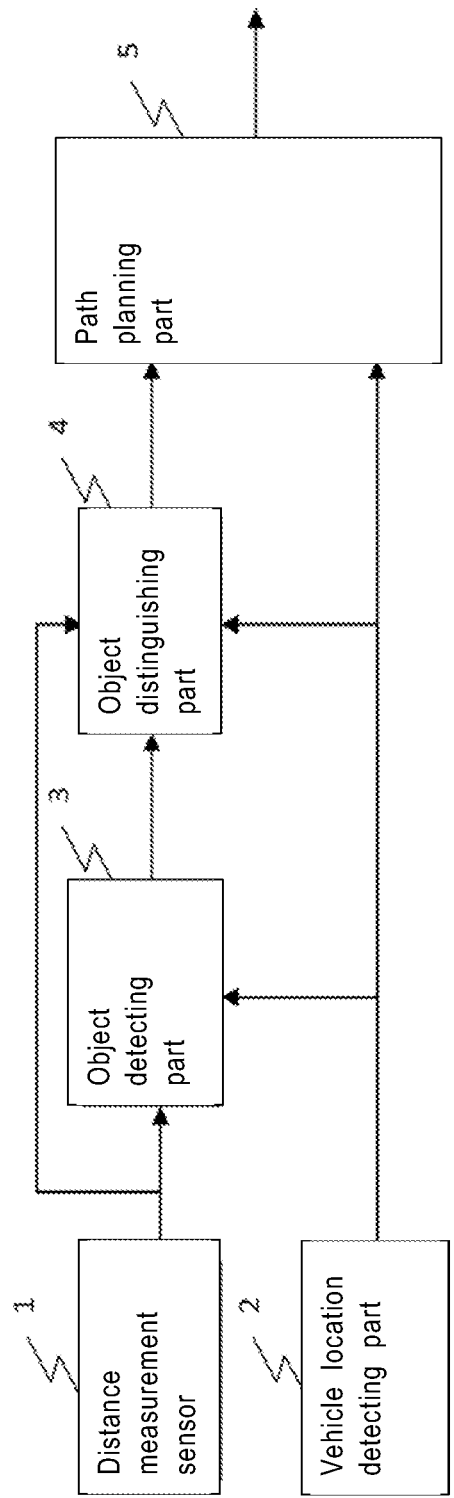
FIG. 13 is a diagram showing the first embodiment of the present application, and is a diagram showing a configuration example of an object path planning device (or the path planning system) with a functional block diagram.

FIG. 13 is a functional block diagram showing the configuration of the path planning device according to the first embodiment. The configuration of the path planning device including a path planning part 5 in the configuration of the object recognition device 100 of FIG. 2 is shown.

The path planning part 5 generates a guidance path to guide to the target parking space based on the result of distinguishing whether the object output from the object recognition device 100 is a static object or a moving object, and the vehicle position and posture angle detected by the own vehicle location detecting part 2.

The path planning part 5 extracts a static object based on the distinction result of whether the object output from the object recognition device 100 is a static object or a moving object, and calculates the boundary information of the static object. Then, a guidance path that enables the vehicle to be guided in the direction along the boundary is generated so that the vehicle can be guided to the target parking space.

As a method of calculating the boundary line information, if the number of detected static objects is equal to or more than a predetermined approximate straight line calculation set value, an approximate straight line is calculated. Various methods can be mentioned as a method for calculating an approximate straight line, and as an example, a method using a RANSAC (Random Sample Consensus) method is shown. In the RANSAC method, some samples are randomly extracted from a group of static objects for which an approximate straight line is calculated, and a least squares method is performed. Then, as a result of performing the least squares method, the distances between the obtained approximate straight line and all the static objects are obtained, and a check is done to know if each distance is less than or equal to the predetermined distance set value, and the number of static objects that are less than or equal to the distance set value is counted. This process is performed once or more and any number of times, and the one with the largest number of static objects that is less than or equal to the distance set value is determined as an approximate straight line. If the variation of the samples is small, the approximate straight line may be calculated only by performing the least squares method on the randomly sampled samples.

Further, by calculating the approximate straight line, it is possible to calculate the boundary position of the static object and the angle of the boundary seen from the vehicle, and the position and angle of the boundary are expressed as the boundary line information.

Further, in the above processing, since the boundary line information of the static object is calculated, the boundary line information is not calculated from the object detected with respect to the moving object.

A known technique can be used as a method of generating a guidance path that guides the calculated boundary information to the target parking space, for example, the technique disclosed in JP 2017-88112 A can be used to generate an induction path (curvature).

If using the technique disclosed in the above, it is necessary to determine the target parking position and posture angle. In cases where the boundary line information of the static object exists only on one side of the vehicle and cases where the boundary line information of the static object exists on both sides of the vehicle, the target parking position and posture angle are set as follows.

If the boundary line information of a static object exists only on one side of the vehicle, the target parking posture angle shall be the angle that the boundary has, the target parking position shall be a position that secures at least the minimum distance that the vehicle and the parked vehicle wished to secure.

If there is a boundary line information for static objects on both sides of the vehicle, the target parking posture angle may be either the average value of the angles of the left and right boundaries or the angle of the boundary of a static object on the near side of the vehicle. The target parking position may be any of the positions where the vehicle and the parked vehicle secure the minimum distance or more that they want to secure, from the position between the left and right boundaries or the boundary of a static object near the vehicle.

Next, the flow of the operation performed by the path planning device will be described with reference to the flowchart of FIG. 14. The processing of the flowchart of FIG. 14 is repeatedly executed while the vehicle is running.

The relationship between each step in FIG. 14 and each functional block in FIG. 13 is as follows. Step S1 is an operation performed by the distance measurement sensor 1, step S2 is an operation performed by the own vehicle location detecting part 2, and step S3 is an operation performed by the object detecting part 3, step S4 is an operation performed by the object distinguishing part 4, steps S5 and S6 are operations performed by the path planning part 5.

Figure 14:
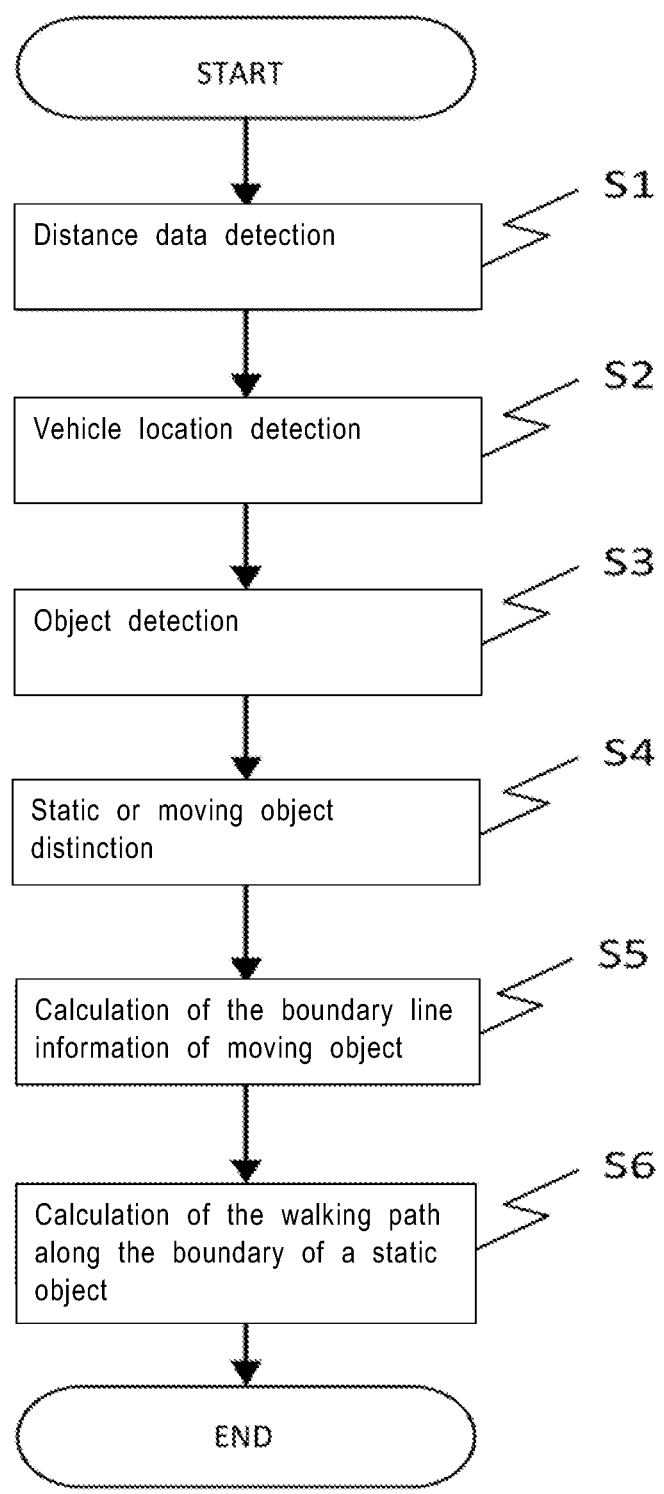
FIG. 14 is a diagram showing the first embodiment of the present application, and is a diagram showing an example of the overall operation of the path planning device (or path planning system) exemplified in FIG. 13 in a flowchart.

Since the operation of steps S1 to S4 shown in FIG. 14 is the same as that of steps S1 to S4 of the flowchart shown in FIG. 4, the description thereof will be omitted.

In step S5, the static object is extracted based on the distinction result of the static object or the moving object of the object output by the object recognition device 4, and the boundary line information of the static object is calculated.

In step S6, the target parking position is determined from the boundary line information of the static object, the guidance path from the vehicle position and the posture angle detected by the own vehicle location detecting part 2 to the target parking position is calculated.

Below, if the vehicle is moving forward toward the parking space, the operation of the path planning device will be described with reference to FIGS. 15 to 20 by taking as an example a case where a human moves while maintaining a relative position with the vehicle.

Figure 15:
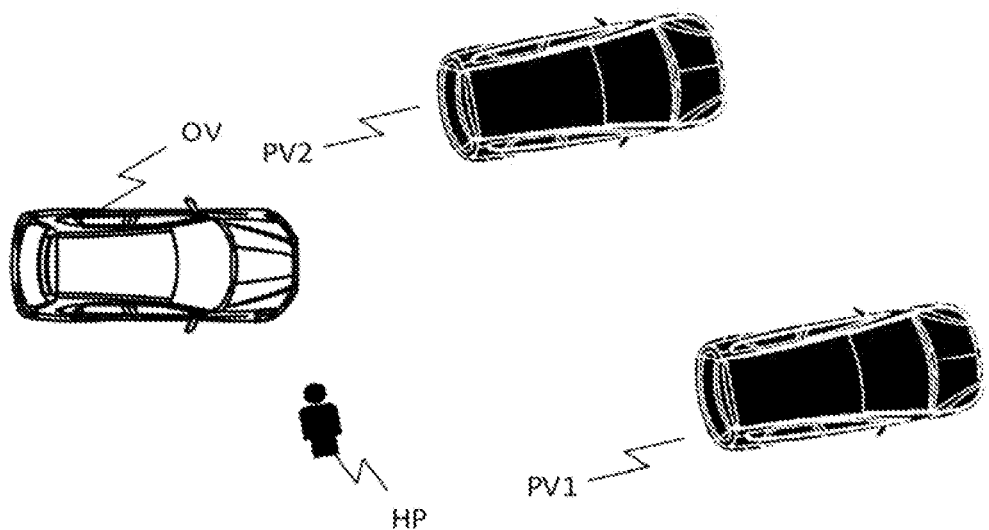
FIG. 15 is a diagram showing the first embodiment of the present application, and is a diagram showing an example of a peripheral situation at the start of a path planning process.

As shown in FIG. 15, the driver HP exists in the front right with respect to the own vehicle OV, and the generation of a guidance path to the target parking space will be described while the vehicle is being advanced toward the space (target parking space) between the two parked vehicles PV1 and PV2 existing in front. In addition, it is assumed that the driver HP moves while maintaining the relative position according to the behavior of the vehicle while guiding the vehicle.

Figure 16:
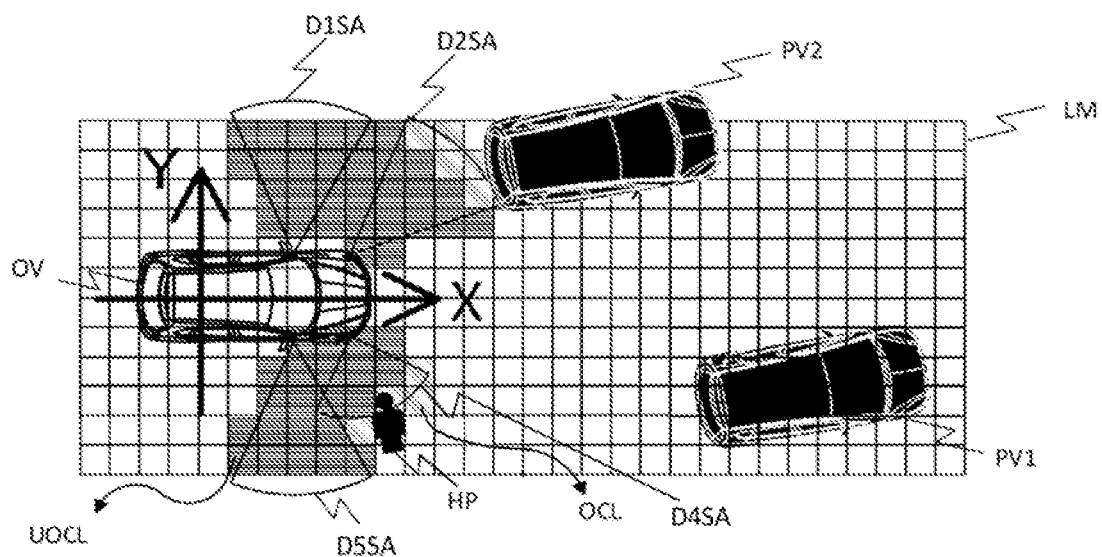
FIG. 16 is a diagram showing the first embodiment of the present application, and is a diagram showing an example of the operation of the path planning process at time t0.

At the start of guidance (time T=t0), the coordinate system shown in FIG. 16 is taken, with the center position of the rear wheel axle of the vehicle as the origin and the direction in which the front of the vehicle is facing as the positive direction of the X axis, as shown in FIG. 16, a grid map LM is generated around the vehicle. The grid map LM of FIG. 16 is generated and stored once at the start of guidance and then the stored, the stored items are recalled and then updated during the guidance. Further, from the distance data detected from the distance measurement sensors D1, D2, D4, D5 at the start of guidance, it is assumed that the reliability of the grid on the grid map LM is updated as shown in FIG. 16 in the reliability calculation part 11.

At time T=t0+Δt, if the own vehicle OV and driver HP advance by Δs, the object detecting part 3 detects the driver position DP as shown in FIG. 6, and the reliability calculation unit 11 updates the reliability as shown in FIG. 7.

Figure 17:
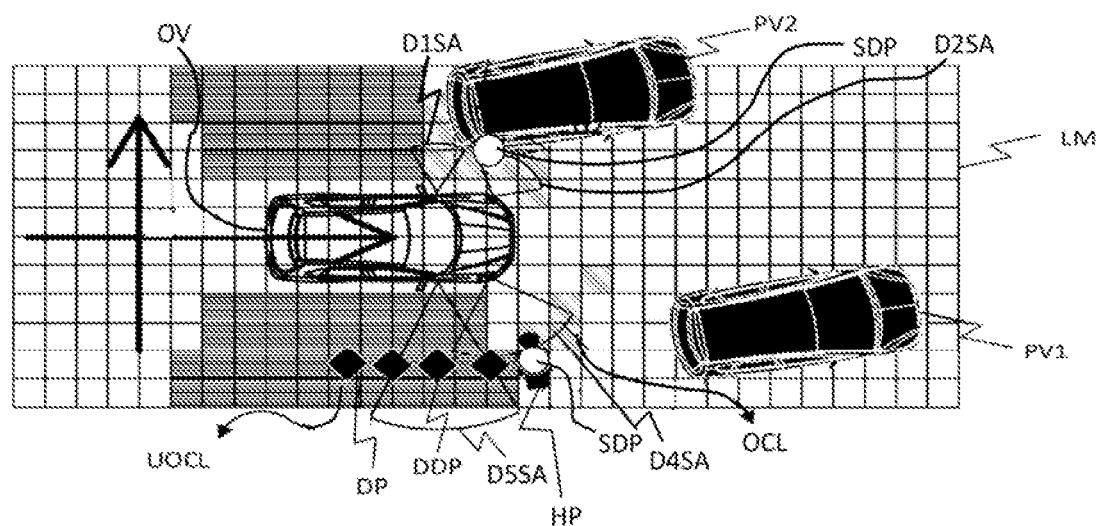
FIG. 17 is a diagram showing the first embodiment of the present application, and is a diagram showing an example of the operation of the path planning process at time t1.

By performing this for each object detection cycle, if the vehicle and the driver move as shown in FIG. 17 at time T=t1, on the right side of the vehicle, the driver position DP is detected according to the movement trajectory of the driver, but at the same time, it is detected that the reliability of the grid at the driver detection position is low, the detection position of the driver is determined to be the moving object position DDP if it is before time T=t1, and is determined to be the static object position SDP if it is time T=t1. This makes it possible to prevent the driver's movement trajectory from being erroneously detected as a parked vehicle.

Figure 18:
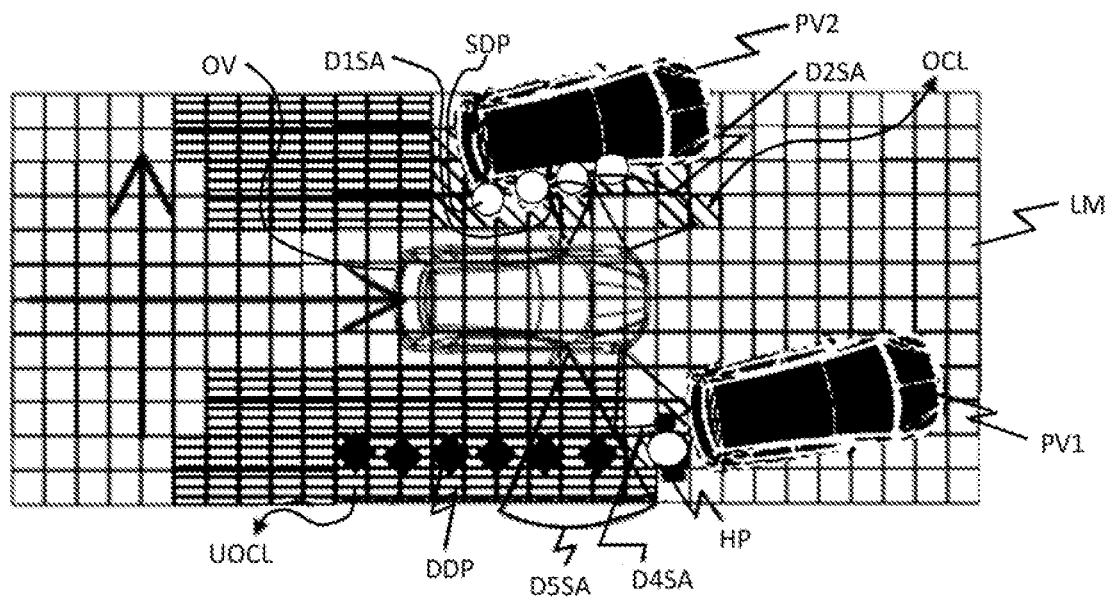
FIG. 18 is a diagram showing the first embodiment of the present application, and is a diagram showing an example of the operation of the path planning process at time t2.

At time T=t2, if the own vehicle OV and the driver HP move as shown in FIG. 18, the movement trajectory of the driver on the right side of the own vehicle OV is further extended, but it is not used to calculate the parking space because it is determined to be the moving object position DDP. On the other hand, the object position is also detected at the position of the static vehicle PV2 existing on the left side of the own vehicle OV, since it is determined that the reliability of the grid position at the object position is also high, the object recognition unit 100 determines it as the static vehicle position SDP.

Figure 19:
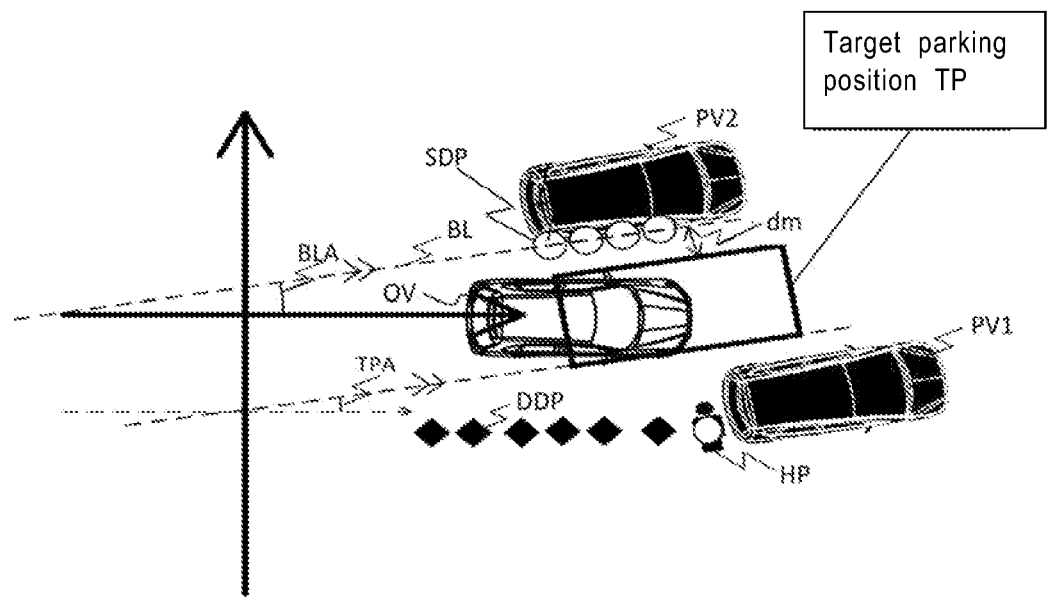
FIG. 19 is a diagram showing the first embodiment of the present application, and is a diagram an example of a method of determining a target parking position at time t2.

Further, at time T=t2, the target parking position TP is determined as shown in FIG. 19. Specifically, by performing the least squares method from the detected static object position SDP in which the static vehicle exists, the approximate straight line of the object position SDP is calculated, and the calculated approximate straight line is used as a boundary line BL of the static vehicle. Then, an angle BLA in the coordinate system set at the start of guidance of the boundary line BL (T=t0) is calculated. The calculated angle BLA is set as a target parking space angle TPA, the target parking position TP is the position along the boundary line BL and the predetermined margin dm.

Figure 20:
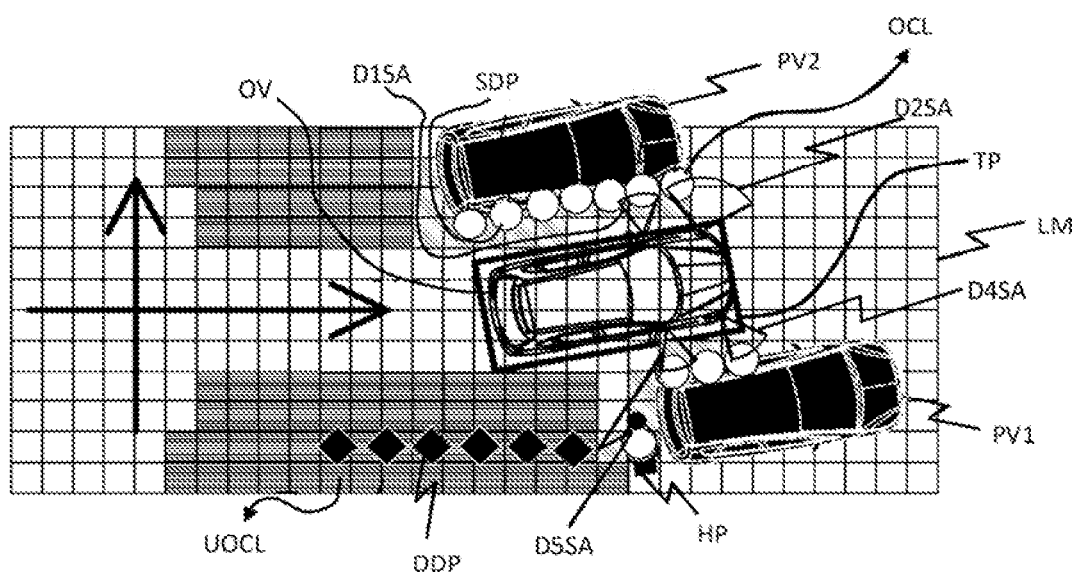
FIG. 20 is a diagram showing the first embodiment of the present application, and is a diagram showing an example of the operation of the path planning process at time t3.

Further, as shown in FIG. 20, at time T=t3, the right side of the vehicle is also required to calculate the boundary line of the parked vehicle, if the static object position SDP is created at more than the set value of the approximate straight line calculation, the target parking position may be recalculated based on the boundary information of the left and right parked vehicles, or the target parking position calculated at time T=t2 can be reused. If recalculating, the angle of the target parking position should be along the average of the angles of the left and right boundaries or the angle of the parked vehicle on the near side, regarding the lateral position with the left and right parked vehicles, there is a method of moving along the center position of the left and right boundary or the near side.

In the above example, an example of guiding the vehicle forward toward the target parking position has been described, however, the path planning device can generate a path that guides the vehicle regardless of whether it moves forward or backward.

Parking Support Device

Next, a parking support device using the path planning device will be described.

Figure 21:
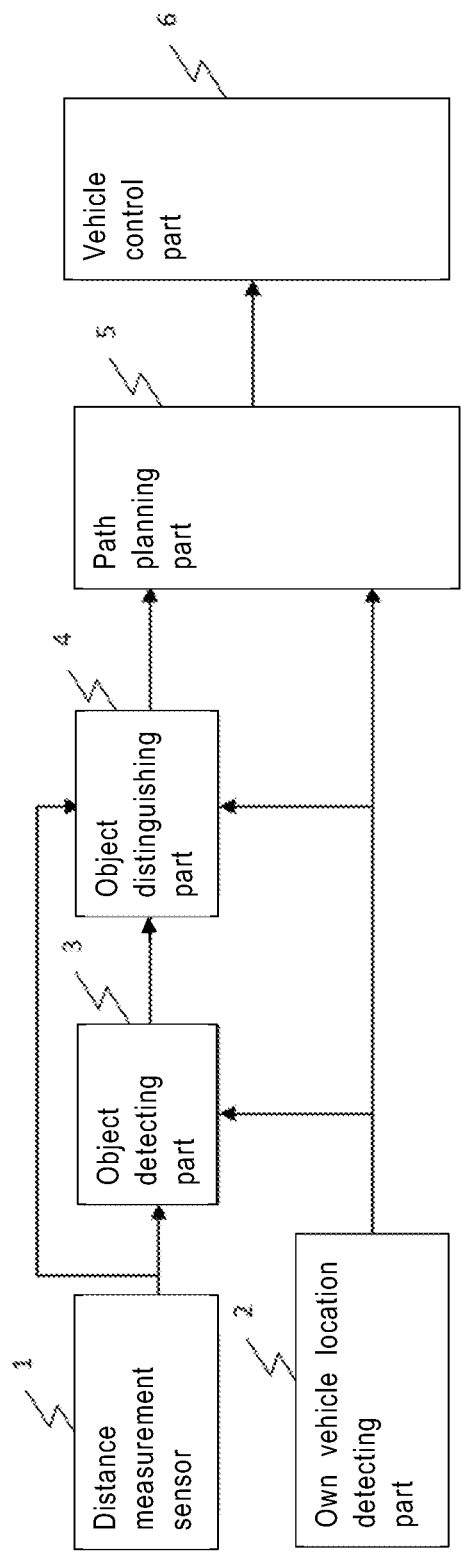
FIG. 21 is a diagram showing the first embodiment of the present application, and is a diagram showing a configuration example of a parking support device (or a parking support system) with a functional block diagram.

FIG. 21 is a functional block diagram showing the configuration of the parking support device according to the first embodiment. The configuration of the parking support device including an own vehicle control part 6 in the configuration of the path planning device of FIG. 13 is shown.

The own vehicle control part 6 performs steering control and drive control of the vehicle as to be able to follow the travel path planned by the path planning part 5.

Next, the flow of the operation performed by the parking support device will be described with reference to the flowchart of FIG. 22. The processing of the flowchart of FIG. 22 is repeatedly executed while the vehicle is running.

The relationship between each step in FIG. 22 and each functional block in FIG. 21 is as follows. Step S1 is an operation performed by the distance measurement sensor 1, step S2 is an operation performed by the own vehicle location detecting part 2, and step S3 is an operation performed by the object detecting part 3, step S4 is an operation performed by the object distinguishing part 4, steps S5 and S6 are operations performed by the path planning part 5, step S7 is an operation performed by the own vehicle control part 6.

Figure 22:
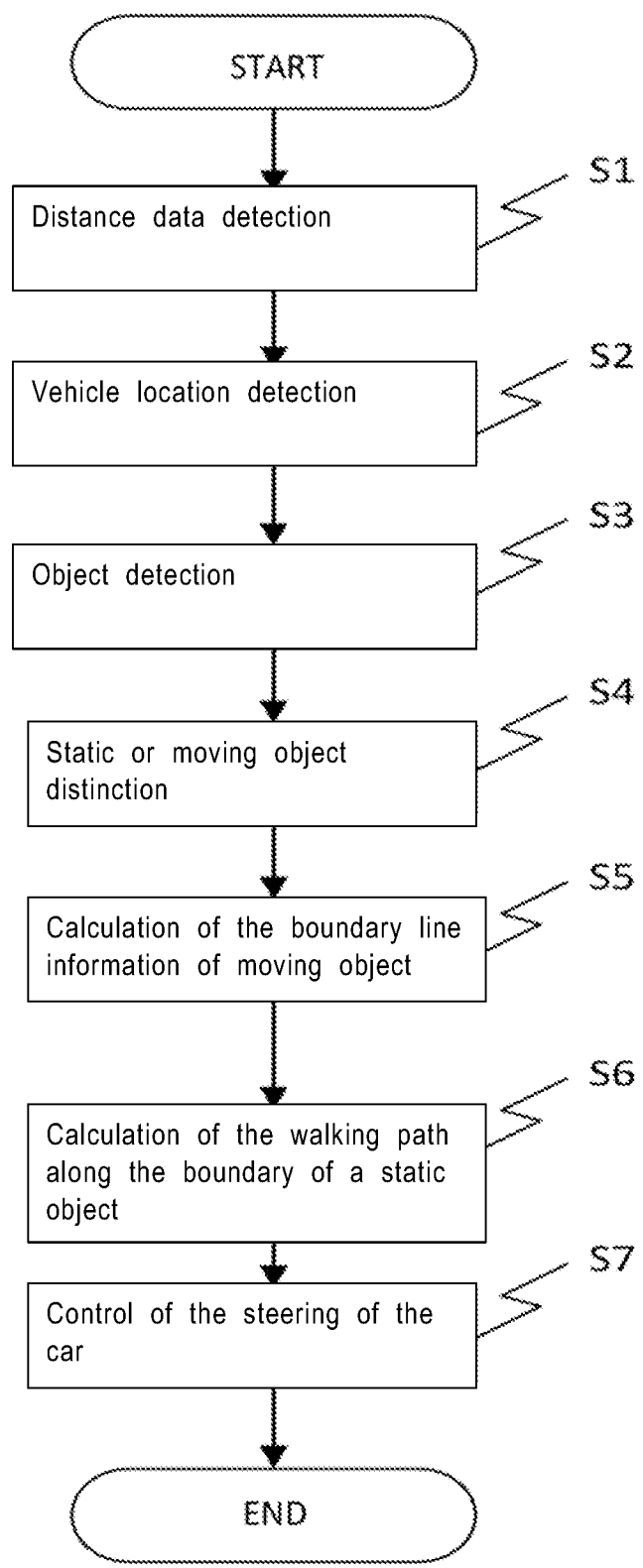
FIG. 22 is a diagram showing the first embodiment of the present application, and is a diagram showing an example of the overall operation of the parking support device (or parking support system) in a flowchart.

Since the operation of steps S1 to S6 shown in FIG. 22 is the same as that of steps S1 to S6 of the flowchart shown in FIG. 7, the description thereof will be omitted.

In step S7, steering control and drive control of the vehicle are performed to be able to follow the travel path planned by the path planning part 5.

As described above, according to the object recognition device 100 according to the present embodiment, based on the vehicle position and attitude angle detected by the distance measurement sensor 1 and the own vehicle location detecting part 2 on the object detected by the object detecting part 3, since it is possible to distinguish whether the detected object is a moving object or a static object from the object distinguishing part 4 that distinguishes the detected object, if recognizing a target parking space between static parked vehicles, even if there is a driver who moves around the vehicle, it is possible to prevent erroneous recognition of the target parking space.

Further, according to the path planning device according to the present embodiment, as it can plan a path to the target parking position, based on the distinction result of whether the detected object output by the object recognition device 100 is a moving object or a static object, and the vehicle position and posture angle detected by the own vehicle location detecting part 2, even if there is a driver (moving object) that moves around the vehicle, it is not affected by the moving object, since it is possible to provide a path that enables parking near a static object, it is possible to reduce the annoyance given to the driver during parking support.

Then, based on the guidance path planned from the path planning part 5 of the path planning part described above, by providing the own vehicle control part 6 that performs steering control and drive control of the vehicle, it becomes possible to function as a parking support device. Therefore, even if there is a driver (moving object) that moves around the vehicle, it is not affected by the moving object, since it is possible to provide a path that enables parking near a static object, it is possible to reduce the annoyance given to the driver during parking support.

Second Embodiment

Figure 23:
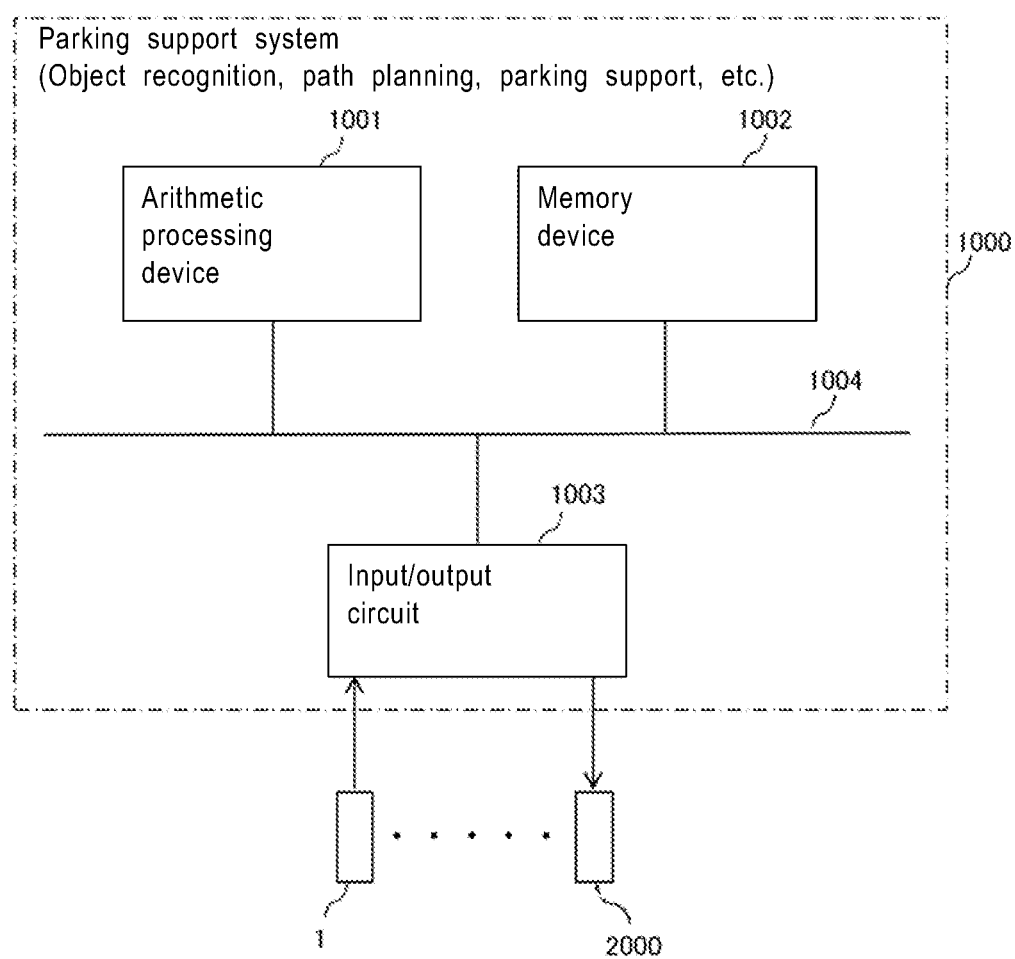
FIG. 23 is a diagram showing the second embodiment of the present application, and is a diagram showing the internal configuration of another system configuration of the parking support system.

The object recognition, the path planning, the parking support, and other functions in the first embodiment can be realized by an in-vehicle system composed of the system configuration of a parking support system 1000 illustrated in FIG. 23, that is, an arithmetic processing unit 1001 such as a CPU (Central Processing Unit), a ROM (Read Only Memory) containing programs that execute each function, a storage device 1002 containing a RAM (Random Access Memory) that stores each data of the execution result of each of the above functions, which is the calculation result of the program, and an input/output circuit 1003. The output of the distance measurement sensor 1 and others are input to the input/output circuit 1003, the input/output circuit 1003 outputs a control signal to a drive system control unit 2000 for the forward/reverse movement of the vehicle and the handling of the remote parking of the vehicle.

In the drawings, the same reference numerals indicate the same or corresponding parts.

In the present invention, each embodiment can be appropriately modified and combined within the scope of the invention.

Although various exemplary embodiments and examples are described in this application, the various features, modes, and functions described in one or more embodiments are not limited to the application of a particular embodiment, but can be applied to embodiments alone or in various combinations.

Accordingly, countless variations not illustrated are envisioned within the scope of the art disclosed in this application. For example, this shall include cases where at least one component is transformed, added or omitted, and even where at least one component is extracted and combined with components of other embodiments.

REFERENCE SIGNS LIST

1: Distance measurement sensor,
2: Own vehicle location detecting part,
3: Object detecting part,
4: Object distinguishing part,
5: Path planning part,
6: Own vehicle control part,
11: Reliability calculation part,
12: Static motion distinguishing part,
1000: Parking support system,
1001: Arithmetic processing unit,
1002: Storage device,
1003: Input output circuit,
2000: Driving system controlling part,
BL: Boundary line,
BLA, TPA: Angle,
D1, D2, D3, D4, D5, D6, D7, D8, D9, D10: Distance measurement sensor,
D1SA, D2SA, D3SA, D4SA, DSSA, D6SA, D7SA, D8SA, D9SA, D10SA: Detectable range,
Dm: Margin,
DP: Object position,
DDP: Moving object position,
SDP: Static object position,
HP: Human,
OV: Own vehicle,
PV, PV1, PV2: Parked vehicle,
OCL, UOCL: Grid,
r, r1, r2, r3, r4: Distance,
TP: Parking position.

The invention claimed is:

1. An object recognition device comprising;
a distance measurement sensor mounted on an own vehicle, wherein the distance measurement sensor sends a detection wave to the object to be detected and receives a reflected wave from the object of the detection wave, and detects a distance to the object as distance data,
an own vehicle location detector that detects an own vehicle position from the data of the vehicle speed and traveling direction of the own vehicle,
an object detector that detects the object position of the object based on the distance data detected by the distance measurement sensor and the own vehicle position detected by the own vehicle location detector, and an object distinguisher that distinguishes whether the object detected by the object detector is a static object or a moving object based on a distance data detected by the distance measurement sensor, a vehicle position detected by the vehicle location detector, and an object position detected by the object detector, wherein the object distinguisher provides a reliability calculator that calculates a reliability of an existence of objects at each position around the own vehicle based on the data of the distance to an object around the own vehicle detected by the distance measurement sensor and the own vehicle position detected by the own vehicle location detector, and a static motion distinguisher that distinguishes whether the detected object is a static object or a moving object based on the object position detected by the object detector and the reliability of the existence of objects at each position around the own vehicle calculated by the reliability calculator, wherein the distance measurement sensor includes a first distance measurement sensor, and a second distance measurement sensor having a detection range different from that of the first distance measurement sensor;

wherein the reliability calculator calculates the reliability of the existence of objects at each grid position in a grid map on a stationary coordinate system around the vehicle, based on the first distance data detected by the first distance measurement sensor and the first vehicle position detected by the own vehicle location detector;

updates the reliability of the existence of objects at each grid position in the grid map around the vehicle, based on the second distance data detected by the second distance measurement sensor and the second vehicle position detected by the own vehicle location detector; and overwrites and updates, at each grid position, the reliability at each grid position calculated and updated by using the first distance measurement sensor and the second distance measurement sensor at each time point;

wherein the static motion distinguisher collates the plurality of present and past object positions detected by the object detector at each of the plurality of present and past time points, with the reliability of the existence of the object at each grid position overwritten and updated by the reliability calculator; and, for each of the plurality of present and past object positions, distinguishes the object position located at the grid position where the reliability is higher than a predetermined reliability as the position of the static object, and distinguishes the object position located at the grid position where the reliability is lower than the predetermined reliability as the position of the moving object.

2. A path planning device comprising;

a path planner that plans a guidance path for guiding an own vehicle to a target parking space, based on a result of distinguishing whether an object is a static object or a moving object output by the object recognition device claimed in claim 1 and the own vehicle position detected by the own vehicle location detector.

3. A parking support device wherein, an own vehicle is controlled toward the target parking space by an own vehicle controller mounted on the own vehicle, based on the guidance path planned by the path planning device claimed in claim 2.

4. An object recognition system wherein, by transmitting a detection wave to an object to be detected and receiving a reflected wave of the detection wave from the object, a distance data to the object is detected by a distance measurement sensor of an object recognition device, an own vehicle position is detected by the object recognition device from a data of a speed and a traveling direction of the own vehicle, and a position of the object is detected by the object recognition device based on the distance data and the position of the own vehicle, the object recognition device calculates a reliability of an existence of objects at each position around the own vehicle based on the data of the distance to an object around the own vehicle detected by the distance measurement sensor and the own vehicle position detected by the own vehicle location detector, and distinguishes whether the detected object is a static object or a moving object based on the object position and the reliability of the existence of objects at each position around the own vehicle, wherein the distance measurement sensor includes a first distance measurement sensor, and a second distance measurement sensor having a detection range different from that of the first distance measurement sensor;

wherein the object recognition device calculates the reliability of the existence of objects at each grid position in a grid map on a stationary coordinate system around the vehicle, based on the first distance data detected by the first distance measurement sensor and the first vehicle position detected by the own vehicle location detector;

updates the reliability of the existence of objects at each grid position in the grid map around the vehicle, based on the second distance data detected by the second distance measurement sensor and the second vehicle position detected by the own vehicle location detector; and overwrites and updates, at each grid position, the reliability at each grid position calculated and updated by using the first distance measurement sensor and the second distance measurement sensor at each time point;

wherein the object recognition device collates the plurality of present and past object positions detected by the object detector at each of the plurality of present and past time points, with the reliability of the existence of the object at each grid position overwritten and updated by the reliability calculator; and, for each of the plurality of present and past object positions, distinguishes the object position located at the grid position where the reliability is higher than a predetermined reliability as the position of the static object, and distinguishes the object position located at the grid position where the reliability is lower than the predetermined reliability as the position of the moving object.

5. A path planning system, wherein;

a guidance path to guide an own vehicle to a target parking space is generated based on a result of distinguishing whether an object is a static object or a moving object output by the object recognition system claimed in claim 4 and the detected own vehicle position.

6. The path planning system according to claim 5, wherein a vehicle control unit mounted on the own vehicle controls the own vehicle toward the target parking space based on the guidance path planned by the path planning system.

* * * * *